US012530257B1

(12) United States Patent
Zhu

(10) Patent No.: US 12,530,257 B1
(45) Date of Patent: Jan. 20, 2026

(54) DUAL-ERROR CORRECTING CODE (ECC) FOR METADATA IN MEMORY SYSTEM

(71) Applicant: Synopsys, Inc., Sunnyvale, CA (US)

(72) Inventor: Jun Zhu, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 29 days.

(21) Appl. No.: 18/584,879

(22) Filed: Feb. 22, 2024

(51) Int. Cl.
*G06F 11/08* (2006.01)
*H03M 13/15* (2006.01)

(52) U.S. Cl.
CPC ......... *G06F 11/08* (2013.01); *H03M 13/1515* (2013.01)

(58) Field of Classification Search
CPC .................... G06F 11/08; H03M 13/1515
See application file for complete search history.

(56) References Cited

U.S. PATENT DOCUMENTS

| 9,183,085 B1* | 11/2015 | Northcott | G06F 11/1012 |
| 10,860,416 B2* | 12/2020 | Kaynak | G06F 11/1044 |
| 11,467,760 B1* | 10/2022 | Avron | G06F 11/10 |
| 2010/0287445 A1* | 11/2010 | Dell | H03M 13/1515 |
| | | | 714/763 |
| 2012/0159281 A1* | 6/2012 | Shalvi | G06F 11/1076 |
| | | | 714/763 |

* cited by examiner

*Primary Examiner* — Albert Decady
*Assistant Examiner* — Grace V Braden
(74) *Attorney, Agent, or Firm* — Korbin S Van Dyke; Haynes Beffel & Wolfeld LLP

(57) ABSTRACT

Error correcting first uncorrected data according to a first error correcting code produces first corrected data and an indicator of whether a device failure is detected. Responsive to the indicator indicating that a device failure is detected, error correcting second uncorrected data according to (1) a second error correcting code and (2) an erasure decoding mode, and using an identification of a failing device produced by the error correcting of the first uncorrected data.

20 Claims, 16 Drawing Sheets

— ECC1 decodes CW-A and CW-B.

— If the ECC1 decoding result is 0 errors in both CW-A and CW-B, then ECC2 decodes CW-C in Error decoding mode, enabled to correct up to 3 errors. If the ECC2 decoding result is NOT 3 CEs, then report the decoding result.

— If the ECC1 decoding result is 1 error in total (in device N) in CW-A and CW-B, then device N is considered a device failure. ECC2 decodes CW-C in Erasure decoding mode, applies 4 erasures to locations of device N, and corrects 4 erasures + 1 error.

— If the ECC1 decoding result is all CEs or no error and total error number is 2 or 3, then check if there is a x4 device N that has at least 2 errors.

— If NO, then ECC2 decodes CW-C in Error decoding mode, enabled to correct up to 3 errors.

— If YES, then device N is considered a device failure. ECC2 decodes CW-C in Erasure decoding mode, applies 4 erasures to the locations of device N, and corrects 4 erasures + 1 error.

— If the ECC1 decoding result is all CEs and total error number is 4, then check if there is a x4 device N that has at least 3 errors.

— If NO, then it's 4 random errors case, ECC2 decodes CW-C in Error decoding mode.

— If the ECC2 decoding result is CE with less than 3 errors, then report CE for all CWs of both ECC1 and ECC2.

— If the ECC2 decoding result is CE with 3 errors, then report UE because aliasing may occur in this case.

— If the ECC2 decoding result is UE, then report UE for all CWs of both ECC1 and ECC2.

— If YES, then device N is considered a device failure. ECC2 decodes CW-C in Erasure decoding mode, applies 4 erasures to the device N, and corrects 4 erasures + 1 error.

FIG. 7

DUAL-ERROR CORRECTING CODE (ECC) FOR METADATA IN MEMORY SYSTEM

TECHNICAL FIELD

The present disclosure generally relates to a memory system. In particular, the present disclosure relates to error correcting code (ECC) for a memory system.

BACKGROUND

Error correcting code (ECC) technology is usable to provide error correction, such as in memory systems using dynamic random access memory (DRAM).

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 7 illustrates an example dual-ECC decoding technique as pseudo-code.

DETAILED DESCRIPTION

Figure 1:
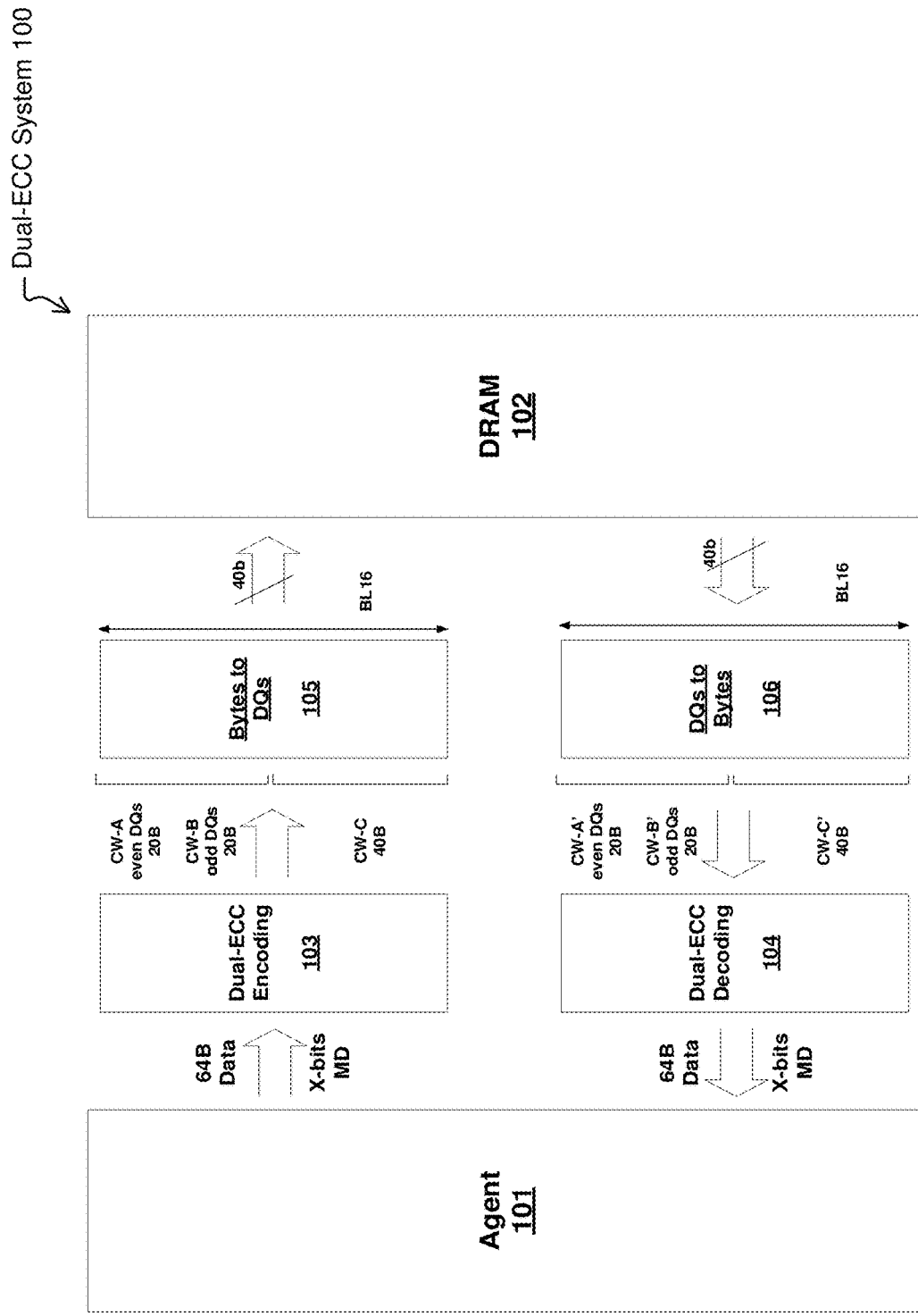
FIG. 1 illustrates a system enabled to use dual-ECC codes for metadata in memory systems.

Aspects of the present disclosure relate to dual-ECC codes for metadata in memory systems. ECC is a reliability, availability, and serviceability (RAS) feature usable for systems using DRAM, e.g., server applications. ECC enables correcting errors caused by DRAM failures and/or link failures. The DRAM failures include row failure (e.g., within a bank of the DRAM), column failure (e.g., crossing rows in a bank), and data signal (e.g., DQ) failure (e.g., crossing banks, rows, and columns). ECC methods and/or techniques used in DRAM systems include enhanced Hamming codes and Reed-Solomon codes. Some server applications require support for detecting failure of a single device and/or single device data correction—ECC enables recovering data from the failure of the single device. Some reliability and/or security techniques rely on user metadata. Some DDR5 systems lack capability to store user metadata. If storage otherwise allocated to storing ECC information (e.g., parity information) is instead allocated to storing user metadata, then ECC capability is impacted. If additional storage is allocated to storing user metadata, then total storage increases. For example, 2 bytes (B) of user metadata per 64 B cacheline requires 4 gigabytes (GB) of extra storage for a 128 GB DRAM system. A dual-ECC using two different ECC codes enables storing user metadata while also enabling the device failure detection feature.

Herein a number of bits is denoted by an integer followed by "b", so 1 b is one bit, 8 b is eight bits, and so forth. A byte is 8 b. A number of bytes is denoted by an integer followed by "B", so 1 B is one byte (equivalent to eight bits), 64 B is sixty-four bytes, and so forth.

Examples of error correction information include ECC codes. Examples of ECC codes include Hamming codes and RS codes. Example RS codes are denoted by RS(n,k), where n is a block length (e.g., a CW size) and k is a message length. A check symbol number is equal to n-k and is equal to 2t. An erasure number is s and an error number is e, where $s+2e<=2t$. An RS(n,k) code is enabled to provide correction for s erasures and e errors in a CW. An example RS(20, 16, 8) code has a CW size of 20, a message length of 16, and a symbol size of 8 bits. An example RS(40, 34, 8) code has a CW size of 40, a message length of 34, and a symbol size of 8 bits. An example RS(40, 32, 8) code has a CW size of 40, a message length of 32, and a symbol size of 8 bits. An example RS(40, 36, 8) code has a CW size of 40, a message length of 36, and a symbol size of 8 bits.

In a context of error correction, an example of an error is an incorrect value at a location. E.g., correcting an error in one bit at a known location is performed by inverting the one bit at the known location. An example of an erasure is an unknown value at a location. E.g., correcting an erasure of one bit at a known location is performed by determining a correct value for the one bit at the known location.

An example of an ECC encoder is a unit enabled to produce ECC information for data according to a specific ECC code. An example of an ECC decoder is a unit enabled to produce corrected data (e.g., error corrected data) from uncorrected data in conjunction with corresponding ECC information according to a specific ECC code. An example of an ECC codec is a unit enabled to produce ECC information according to a particular ECC code and to produce corrected data from uncorrected data in conjunction with ECC information according to the particular ECC code.

An example of a device failure is when a DRAM chip is inoperable for its desired purpose. Some device failures are detectable by an ECC decoder. An example of a dual inline memory module (DIMM) is one or more DRAM chips and optional additional components interconnected, such as on a pluggable module (e.g., on a printed circuit board), usable to implement DRAM-based memory.

An example of fault bounding, such as in a DDR5 context, is limiting a number of failure patterns produced by DRAM (e.g., a DIMM having one or more DRAM chips), such as in situations of multi-bit errors. Fault bounding is implementable by error correcting within the DRAM (e.g., using DRAM-internal ECC capabilities). As a specific example, fault boundaries for a memory of ×8 DRAMs correspond to high and low nibbles, each of four bits, and each corresponding to a half-device failure detection granularity. As another specific example, fault boundaries for a memory of ×4 DRAMs correspond to one ×4 device, corresponding to a whole-device failure detection granularity. As yet another specific example, fault boundaries for a memory of ×4 DRAMs correspond to a portion of one ×4 device (e.g., a single DQ).

Examples of dual-ECC codes for metadata in memory systems and operation thereof are described herein. An example 10×4 DDR5 configuration enables storage of 2 B of user metadata per 64 B of user data and enables the device failure detection feature. Two Reed-Solomon (RS) codes are used, one stronger (referred to as the "strong" code; also referred to as the first code or alternatively ECC1) than the other (referred to as the "weak" code; also referred to as the second code or ECC2). E.g., the strong code enables detection and/or correction of more errors than the weak code. An example strong code enables 100% coverage for the device failure detection feature in error decoding mode. An example weak code covers user metadata and enables 100% coverage for the device failure detection feature in erasure decoding mode.

ECC1 (e.g., the strong code) is an example ECC code usable for, e.g., the lower 32 B of 64 B of user data. ECC2 (e.g., the weak code) is an example ECC code usable for, e.g., the higher 32 B of the 64 B of user data as well as the user metadata. One or more symbol formats are usable. ECC2 decoding is responsive to results of ECC1 decoding (e.g., a form of cascaded ECC). For example, the ECC2 decoding is according to a decoding mode selected based on the results of the ECC1 decoding. The decoding modes include an error decoding mode and an erasure decoding mode. For another example, the ECC2 erasure decoding mode is according to erasure locations (if applicable) as determined by the ECC1 decoding.

Overall, dual-ECC techniques enable, for example, 2 B of user metadata per 64 B of user data in 10×4 DRAM configurations. Strong ECC enables covering 100% of particular device failures and accurately locates a bad device. Weak ECC embeds user metadata in a code word (CW) and uses the bad device location information from the strong ECC as erasures to enhance error correction capability with erasure decoding. Cascaded ECC decoding optionally includes pipeline control. Multiple data interleaving patterns/schemes enable improving ECC coverage of DRAM failures.

A specific example technique for dual-ECC codes is as follows. There are three CWs in a DDR5-based system having ten ×4 (e.g., ten DDR5 compatible DRAM devices each having four bits of input/out) devices and using a 16-bit burst length (16 BL). The first 8-bits (8 BL) of the 16 BL correspond to, e.g., 40 B of data managed in accordance with a first RS code, such as an RS(20,16) ECC code, with n=20, k=16, t=2, such as referred to as ECC1. There are two codewords, CW-A and CW-B. Each CW has 16 B of user data and 4 B of ECC parities. ECC1 decoding is in error decoding mode and is enabled to correct 2 symbol errors (s+2e=0+2×2=4=2t).

The second 8 BL correspond to 40 B of data managed in accordance with a second RS code, such as an RS(40,34) ECC code, with n=40, k=34, t=3, such as referred to as ECC2. There is one codeword, CW-C. CW-C has 32 B of user data, 2 B of user metadata and/or optional Error Detection Code (EDC) information (e.g., to detect aliasing), and 6 B of ECC parities. ECC2 decoding is selectively according to either of two decoding modes: (1) Error decoding mode enabled to correct up to 3 symbol errors (s+2e=0+2×3=6=2t) or (2) Erasure decoding mode, enabled to correct 4 erasures and 1 symbol error (s+2e=4+2×1=6=2t).

An example of an agent is an element enabled to access memory, such as a DRAM memory. Specific examples of agents include a central processing unit (CPU) graphics processing unit (GPU), a direct memory access (DMA) controller, an input/output (I/O) controller, and a processing device, as well as cache and/or memory controllers therein.

An example of a DRAM is a DDR DRAM such as a DDR4 or DDR5 DRAM. An example of a DDR interface is an interface that enables communication on both edges of a clock, e.g., a rising edge and a falling edge. An example of a unit interval (UI) is a minimum amount of time between data changes, e.g., one-half of a clock cycle for DDR DRAM.

An example of user data (e.g., to be provided to an ECC encoder or produced by an ECC decoder) is 64 B of cache line data from an agent. An example of user metadata is one or more bits of cache line status associated with the cache line. As a specific example, consider two bits of metadata used in managing coherency between multiple agents (e.g., for Compute eXpress Link 3.0) and encoded as follows, 00: no agent has a copy of this data, 01: one or more agents has a shared copy of this data, 10 and 11: one agent has an exclusive copy of this data.

An example of a processor is a hardware unit (e.g., hardware circuitry such as one or more active devices) enabled to execute program code. Processors may include one or more controllers and/or state machines. Processors are implementable according to Application Specific Integrated Circuit (ASIC), Field-Programmable Gate Array (FPGA), and/or custom design techniques. Processors are manufacturable according to integrated circuit, optical, and quantum technologies. Processors use one or more architectural techniques such as sequential (e.g., Von Neumann) processing, Very Long Instruction Word (VLIW) processing. Processors use one or more microarchitectural techniques such as executing instructions one-at-a-time or in parallel, such as via one or more pipelines. Processors are directed to general purpose uses (and/or) special purpose uses (such as signal, audio, video, and/or graphics uses). Processors are fixed function or variable function such as according to programming. Processors include any one or more of registers, memories, logical units, arithmetic units, and graphics units. The term processor is meant to include processor in the singular as well as processors in the plural, such as multi-processors and/or clusters of processors.

Dual-ECC capability for metadata in memory systems enables storing user metadata (e.g., in some DDR5 systems that otherwise lack such capability) while also enabling whole-device and/or half-device failure detection features as well as error correction features. The failure detection and error correction features are enabled without adding additional memory devices. As a specific example, using dual-ECC capability enables a DDR5-based system in which a portion of memory is allocated to storage of user metadata that would otherwise be allocated to storage of ECC information and the system is enabled to detect and correct whole-device and half-device failures.

FIG. 1 illustrates a system enabled to use dual-ECC codes for metadata in memory systems as Dual-ECC System 100. Dual-ECC System 100 includes Agent 101, DRAM 102, Dual-ECC Encoding 103, Dual-ECC Decoding 104, Bytes to DQs 105, and DQs to Bytes 106. For memory writes, Agent 101 is enabled to write information to DRAM 102 via Dual-ECC Encoding 103 and Bytes to DQs 105. For memory reads, Agent 101 is enabled to read information from DRAM 102 via DQs to Bytes 106 and Dual-ECC Decoding 104.

Returning to memory writes, Agent 101 provides 64 B of (write) user data and one or more bits (X-bits) of user metadata to Dual-ECC Encoding 103. Dual-ECC Encoding 103 processes the 64 B of user data in an upper half and a lower half each 32 B. Dual-ECC Encoding 103 encodes the lower 32 B half of the user data according to a first ECC code to produce 8 B of first ECC information. Dual-ECC Encoding 103 provides the lower 32 B half of the user data and the 8 B of first ECC information to Bytes to DQs 105 as CW-A (of 20 B) for even DQs and CW-B (of 20 B) for odd DQs. Dual-ECC Encoding 103 encodes the upper 32 B half of the user data, the one or more bits of user metadata, and optional EDC information according to a second ECC code to produce 6 B of second ECC information. Dual-ECC Encoding 103 provides the upper 32 B half of the user data, the one or more bits of user metadata and the optional EDC information (if any), and the 6 B of second ECC information to Bytes to DQs 105 as CW-C (of 40 B) for even and odd DQs. Bytes to DQs 105 processes CW-A (20 B), CW-B (20 B), and CW-C (40 B) to convert the 80 B total (80 B*8 b/B=640 b) into 40 b of serially provided information for a 16-bit burst length 16 BL to DRAM 102 (40 b*16=640 b). The processing of Bytes to DQs 105 may further include interleaving, as described in more detail following.

Returning to memory reads, DRAM 102 provides 40 b of serially provided information for a 16-burst length 16 BL to DQs to Bytes 106. DQs to Bytes 106 processes the 16-bit burst length 16 BL to convert the 640 b total (40 b*16-640 b) into 80 B total (80 B*8 b/B=640 b). The processing may further include deinterleaving. DQs to Bytes 106 provides the 80 B total as CW-A' (of 20 B), the CW-B' (of 20 B), and the CW-C' (of 40 B) to Dual-ECC Decoding 104. Dual-ECC Decoding 104 decodes (e.g., corrects zero or more errors in) the CW-A' (20 B) and the CW=B' (20 B) according to the first ECC code to produce a lower 32 B half of 64 B of (read) user data. Dual-ECC Decoding 104 decodes (e.g., corrects zero or more errors in) the CW-C' (40 B) according to the second ECC code to produce an upper 32 B half of the 64 B of user data and one or more bits of user metadata. The decoding according to the second ECC code is dependent on information from the decoding according to the first ECC code. Optional EDC information (if any) is used to check the user data and the user metadata (as decoded according to the second ECC code) for otherwise undetectable errors. Dual-ECC Decoding 104 provides the 64 B of user data and the one or more bits (X-bits) of user metadata to Agent 101.

The processing of Dual-ECC Encoding 103 and Dual-ECC Decoding 104 assume that each respective byte of the lower 32 B half of the user data is to be written into (and read from) a same storage device as a corresponding respective byte of the upper 32 B half of the user data. For example, the least significant byte of the lower 32 B half of the user data is written into a first DRAM device and the least significant byte of the upper 32 B half of the user data is also written into the first DRAM device. Continuing with the example, the next significant byte of the lower 32 B half of the user data is written into a same DRAM device as the next significant byte of the upper 32 B half of the user data, and so forth through the most significant bytes of the lower and upper 32 B halves of the user data. The processing of Bytes to DQs 105 and writing of DRAM 102 is in accordance with the writing of each respective byte of the lower and upper 32 B halves of the user data into corresponding same respective storage devices. Reading of DRAM 102 and the processing of DQs to Bytes 106 is in accordance with the reading of each respective byte of the lower and upper 32 B halves of the user data from corresponding same respective storage devices.

Figure 2:
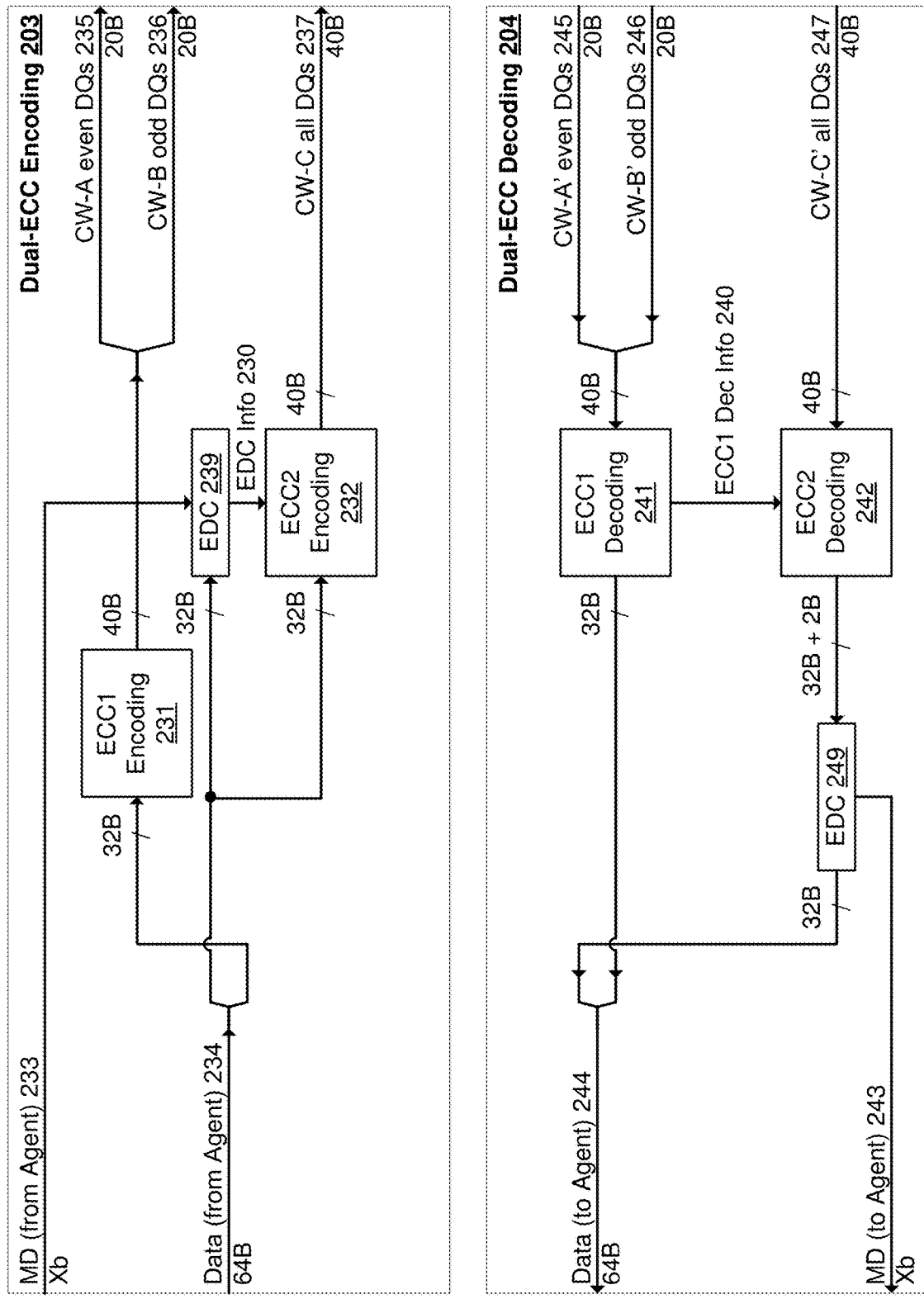
FIG. 2 illustrates an example of dual-ECC encoding and decoding.

FIG. 2 illustrates an example of dual-ECC encoding and decoding.

Dual-ECC Encoding 203 illustrates an example of Dual-ECC Encoding 103 of FIG. 1. Dual-ECC Encoding 203 includes two ECC encoders, ECC1 Encoding 231, and ECC2 Encoding 232, as well as (optional) EDC (encoder) 239. Each of Dual-ECC Encoding 103, Dual-ECC Encoding 203, ECC1 Encoding 231, and ECC2 Encoding 232, as well as EDC (encoder) 239 is an example of error correcting hardware circuitry, e.g., error correcting encoding hardware circuitry.

ECC1 Encoding 231 receives the lower 32 B of 64 B of user data (Data (from Agent) 234) from an agent, such as Agent 101 of FIG. 1. ECC1 Encoding 231 encodes the lower 32 B of 64 B Data (from Agent) 234 according to a first ECC code to produce 8 B of first ECC information. The encoding is optionally in two 16 B chunks each producing 4 B of ECC information so that each chunk is processed to 20 B, provided respectively as CW-A even DQs 235 and CW-B odd DQs 236. An example of the first ECC code usable for each of the two 16 B chunks is an RS(20, 16, 8) code. This code enables, via a single error decoding mode, correcting up to two errors per 16 B chunk and correcting 100% of 4 single errors caused by a failure of one ×4 DRAM.

EDC (encoder) 239 receives one or more user MetaData bits (MD (from Agent) 233) as well as the upper 32 B of 64 B of user data (Data (from Agent) 234) from the agent. EDC (encoder) 239 encodes the received information according to an EDC code to produce one or more bits of EDC information. EDC (encoder) 239 provides a total of 2 B of information (MD (from Agent) 233 and the one or more bits of EDC information) to ECC2 Encoding 232 as EDC Info 230.

ECC2 Encoding 232 receives the upper 32 B of the 64 B of user data (Data (from Agent) 234) in addition to EDC Info 230 from EDC (encoder) 239. ECC2 Encoding 232 encodes the provided information according to a second ECC code to produce 6 B of second ECC information. ECC2 Encoding 232 provides the upper 32 B of user data, the 2 B of EDC Info 230, and the 6 B of second ECC information as CW-C all DQs 237. An example of the second ECC code usable for the 34 B of information is an RS(40, 34, 8) code. This code enables, via a selectable one of an error decoding mode and an erasure decoding mode, correcting three single errors (error decoding mode) or correcting four erasure errors and one single error (erasure decoding mode).

Dual-ECC Decoding 204 illustrates an example of Dual-ECC Decoding 104 of FIG. 1. Dual-ECC Decoding 204 includes two ECC decoders, ECC1 Decoding 241 and ECC2 Decoding 242, as well as an optional EDC decoder, EDC (decoder) 249. Operation of elements of Dual-ECC Decoding 204 is conceptually reverse that of Dual-ECC Encoding 203. Each of Dual-ECC Decoding 104, Dual-ECC Decoding 204, ECC1 Decoding 241 and ECC2 Decoding 242, as well as EDC (decoder) 249D-249 is an example of error correcting hardware circuitry, e.g., error correcting decoding hardware circuitry.

ECC1 Decoding 241 receives the lower 40 B of 80 B of DRAM data (CW-A' even DQs 245 and CW-B' odd DQs 246) from a DRAM, such as DRAM 102 of FIG. 1. Assuming interleaving of odd and even DQs, ECC1 Decoding 241 decodes the 20 B from the even DQs (CW-A' even DQs 245) according to the first ECC code to produce 16 B of error corrected user data, and decodes the 20 B from the odd DQs (CW-B' odd DQs 246) according to the first ECC code to produce 16 B of error corrected user data. The 32 B of error corrected user data is provided to the agent via the lower 32 B of Data (to Agent) 244. An indicator of whether ECC1 Decoding 241 detected a device failure is provided to ECC2 Decoding 242, and responsive to the detection of the device failure, indicators of error locations usable by ECC2 Decoding 242 as erasure locations, are provided to ECC2 Decoding 242. The device failure and error location indicators are provided via ECC1 Dec Info 240.

ECC2 Decoding 242 receives the upper 40 B of the 80 B of DRAM data (CW-C' all DQs 247) from the DRAM as well as the indicators from ECC1 Decoding 241 (ECC1 Dec Info 240). ECC2 Decoding 242 decodes the 40 B according to the second ECC code to produce 32 B of error corrected user data as well as one or more bits of error corrected user metadata and/or optional EDC information. The 32 B of error corrected user data is provided to the agent via the upper 32 B of Data (to Agent) 244. The error corrected user metadata is provided to the agent via MD (to Agent) 243.

Responsive to the detection of the device failure by ECC1 Decoding 241 as communicated by EDC Info 230, ECC2 Decoding 242 operates in erasure decoding mode and uses the error location indicators as erasure locations. Responsive to lack of detection of a device failure, ECC2 Decoding 242 operates in error decoding mode and ignores the error location indicators. Thus, the indicator of whether ECC1 Decoding 241 detected a device failure is usable as an error correcting mode indicator, with detection of a device failure indicating an erasure decoding mode and lack of detection of a device failure indicating an error decoding mode.

The processing of ECC1 Encoding 231 and ECC2 Encoding 232 as well as ECC1 Decoding 241 and ECC2 Decoding 242 assume that each respective byte of the lower 32 B half of the user data is to be written into (and read from) a same storage device as a corresponding respective byte of the upper 32 B half of the user data.

EDC (decoder) 249 receives the 32 B of error corrected user data as well as one or more bits of error corrected user metadata and/or optional EDC information from ECC2 Decoding 242 and uses the optional EDC information to check that the results of ECC2 Decoding 242 are correct.

Dual-ECC Encoding 203 and Dual-ECC Decoding 204 enable correcting bounded faults that impact three or more DQs and support the device failure detection feature for ×4 DRAMs. In some examples of Dual-ECC Encoding 203, ECC1 Encoding 231 is implemented via two identical or substantially identical blocks each enabled to process 16 B of data independently according to the first ECC code. Similarly, in some examples of Dual-ECC Decoding 204, ECC1 Decoding 241 is implemented via two identical or substantially identical blocks each enabled to process 20 B of data independently according to the first ECC code. In some examples of Dual-ECC Encoding 203 and Dual-ECC Decoding 204 together, the ECC encoding and decoding functions are performed by three codecs, two for the first ECC code and one for the second ECC code. In some examples of Dual-ECC Decoding 204, ECC1 Decoding 241 completes decoding in a single cycle, such that when ECC2 Decoding 242 begins decoding, results from ECC1 Decoding 241 are available.

EDC (encoder) 239 and EDC (decoder) 249 are optional. In examples where EDC (encoder) 239 is omitted, MD (from Agent) 233 is provided directly to ECC2 Encoding 232. In examples where EDC (decoder) 249 is omitted, ECC2 Decoding 242 directly supplies Data (to Agent) 244 and MD (to Agent) 243.

Figure 5:
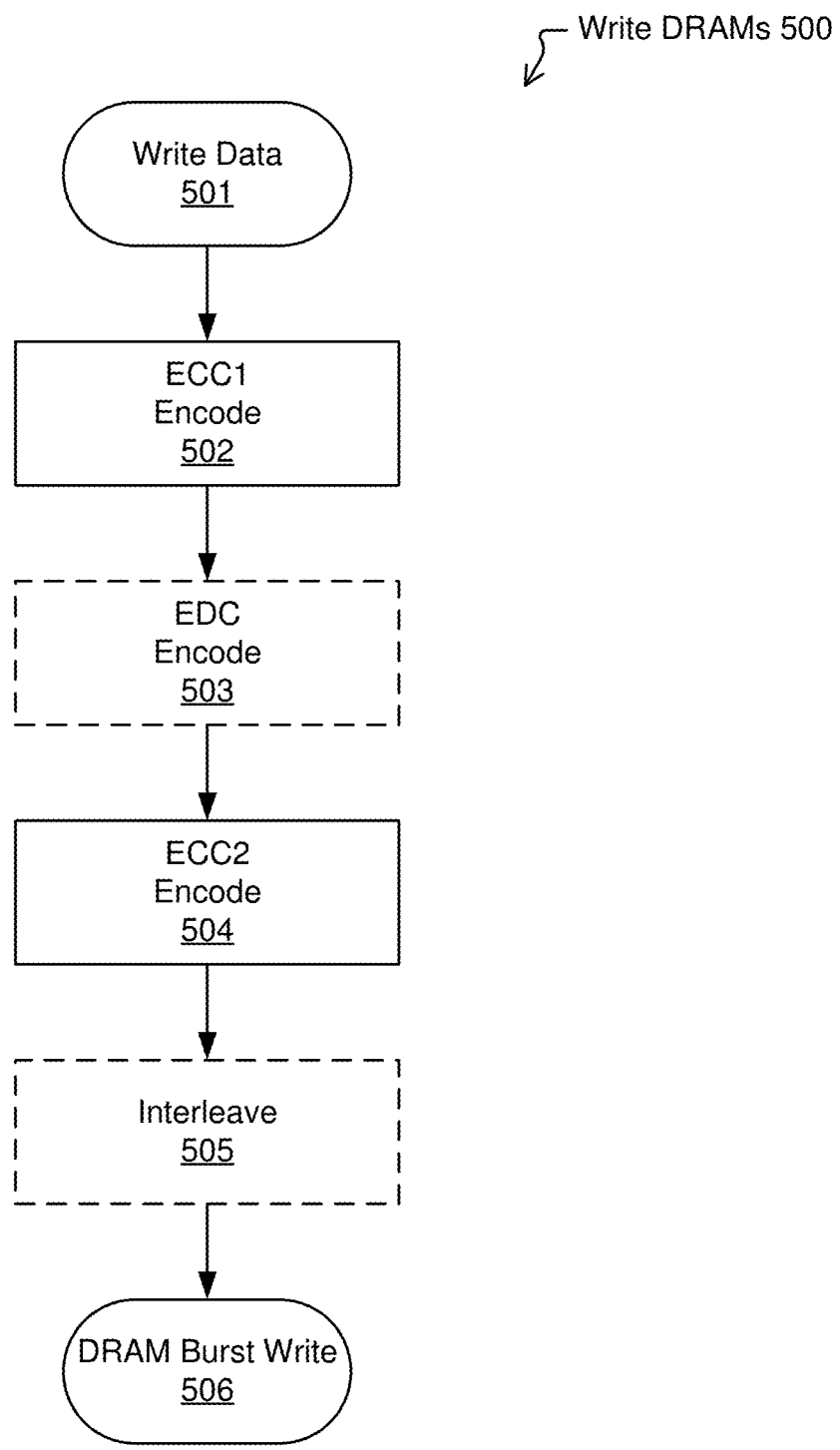
FIG. 5 illustrates a flow diagram of performing a write operation to DRAM using dual-ECC encoding to enable error correction.

An example operation of Dual-ECC Encoding 203 is illustrated in FIG. 5 and described in more detail below.

Figure 6:
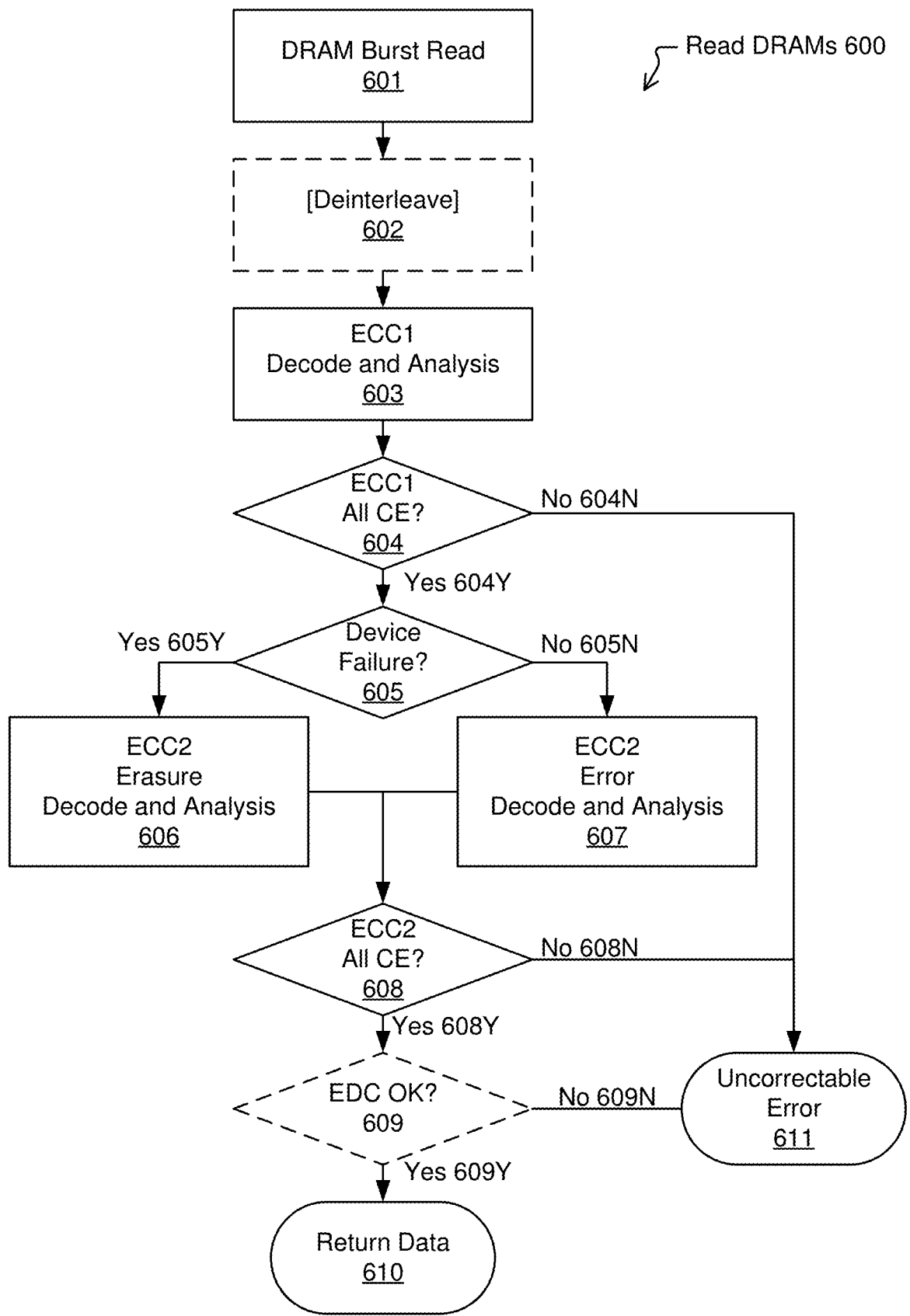
FIG. 6 illustrates a flow diagram of performing a read operation from DRAM using dual-ECC decoding to perform error correction.

An example operation of Dual-ECC Decoding 204 is illustrated in FIG. 6 and described in more detail below.

Figure 3A:
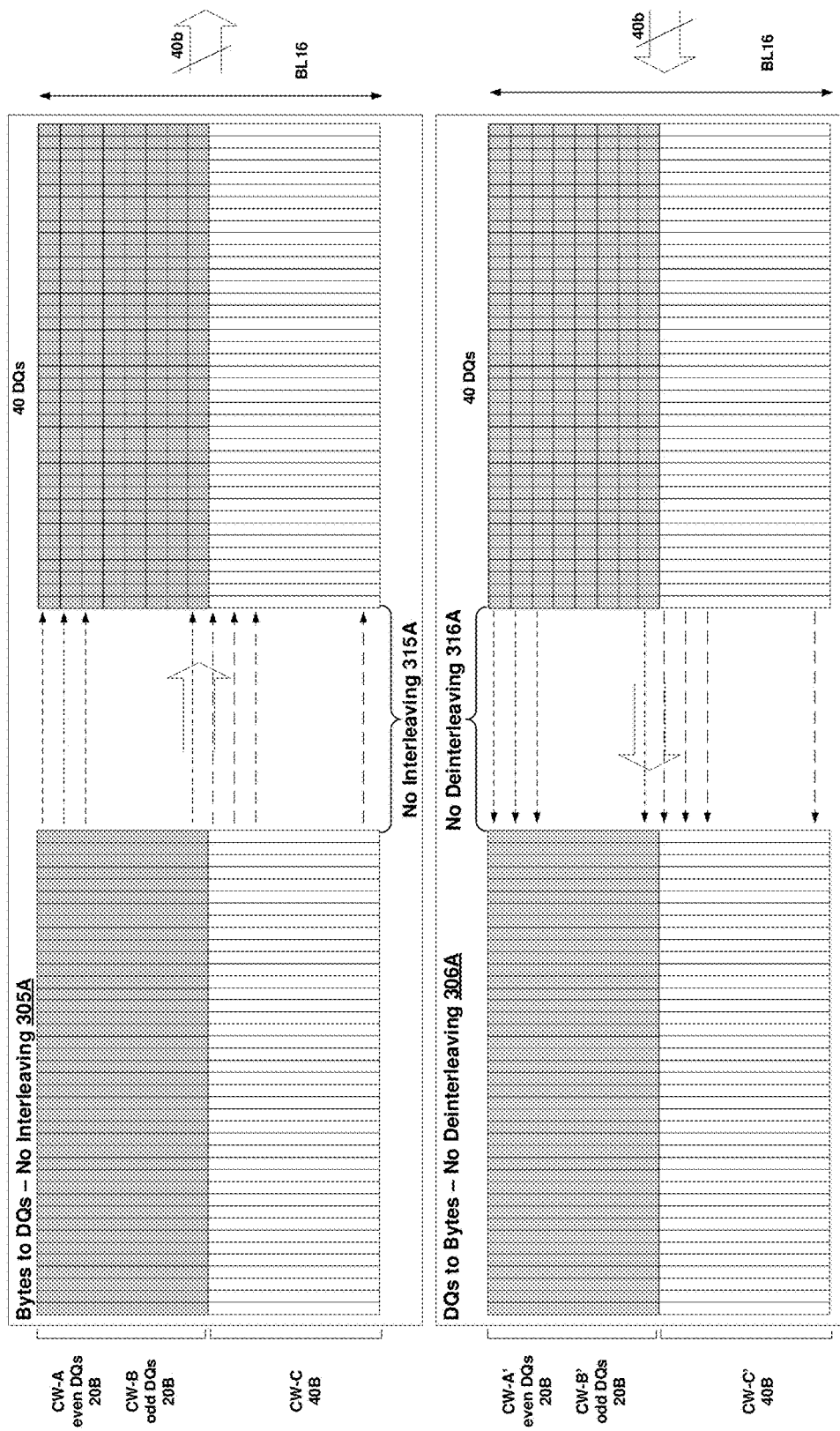
FIG. 3A illustrates a non-interleaved example of communication between dual-ECC encoding/decoding elements and DRAM.

FIG. 3A illustrates a non-interleaved example of communication between dual-ECC encoding/decoding elements and DRAM as Bytes to DQs-No Interleaving 305A and DQs to Bytes—No Deinterleaving 306A.

Bytes to DQs—No Interleaving 305A illustrates operation of a non-interleaved example of Bytes to DQs 105 of FIG. 1. The 80 B total provided bytes are serialized a byte at a time "straight across", e.g., without interleaving, onto 16 bit lines 16 BL as illustrated by No Interleaving 315A. Each of the 40 DQs of each of the 16 bit lines corresponds to a UI.

DQs to Bytes—No Deinterleaving 306A illustrates operation of a non-interleaved example of DQs to Bytes 106 of FIG. 1. Each of the 40 DQs of each of the 16 bit lines corresponds to a UI. The 640 b total are deserialized a byte at a time "straight across", e.g., without interleaving, into 80 B total received bytes, as illustrated by No Deinterleaving 316A.

Figure 3B:
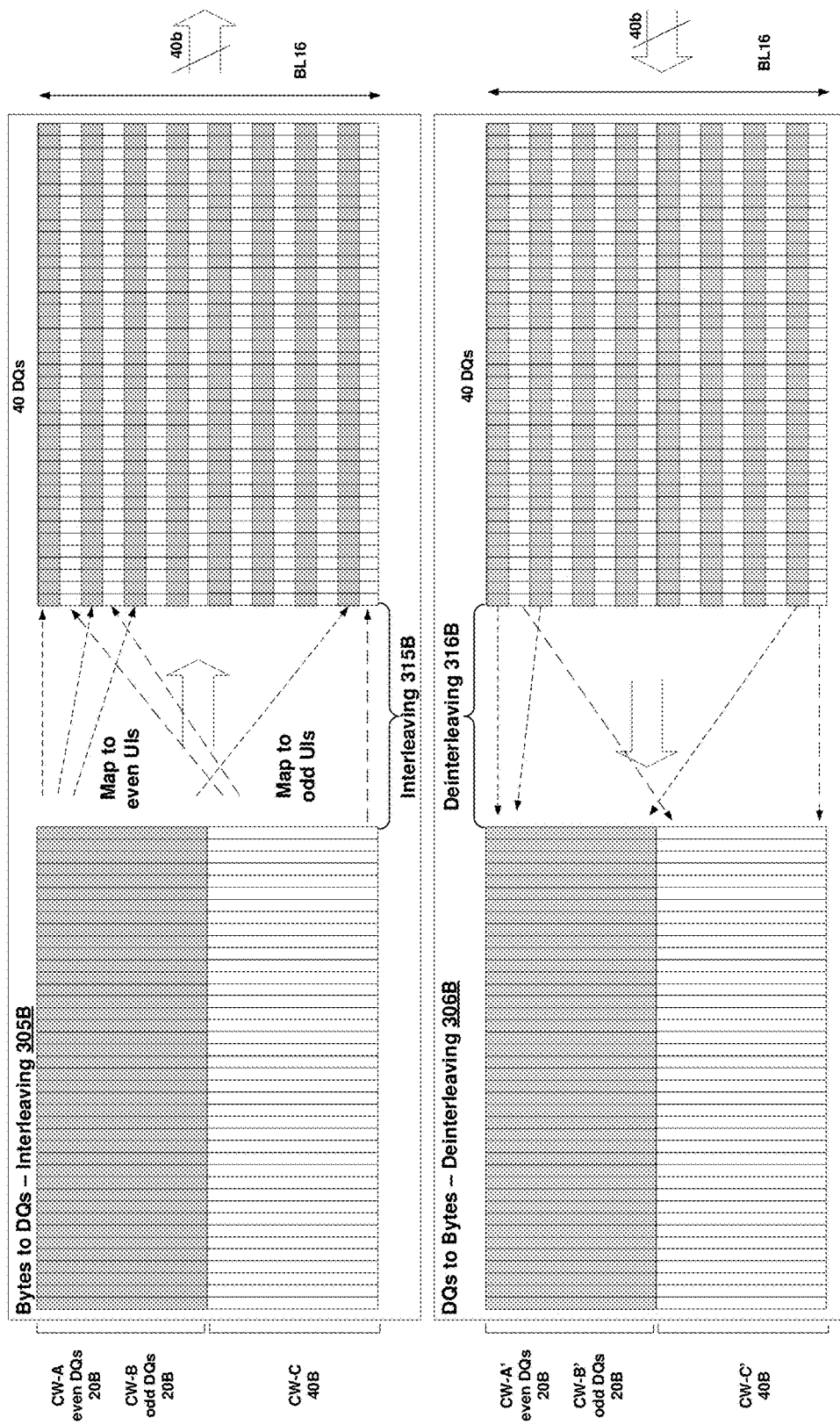
FIG. 3B illustrates an interleaved example of communication between dual-ECC encoding/decoding elements and DRAM.

FIG. 3B illustrates an interleaved example of communication between dual-ECC encoding/decoding elements and DRAM as Bytes to DQs—Interleaving 305B and DQs to Bytes-Deinterleaving 306B.

Bytes to DQs—Interleaving 305B illustrates operation of an interleaved example of Bytes to DQs 105 of FIG. 1. The 80 B total provided bytes are serialized two bytes at a time "even-and-odd", e.g., with interleaving, onto 16 bit lines 16 BL as illustrated by Interleaving 315B. Each of the 40 DQs of each of the 16 bit lines corresponds to a UI.

DQs to Bytes—Deinterleaving 306B illustrates operation of an interleaved example of DQs to Bytes 106 of FIG. 1. Each of the 40 DQs of each of the 16 bit lines corresponds to a UI. The 640 b total are deserialized two bytes at a time "even-and-odd", e.g., with interleaving, into 80 B total received bytes, as illustrated by Deinterleaving 316B. Other interleaving configurations are usable, dependent, e.g., on DRAM characteristics.

Figure 4:
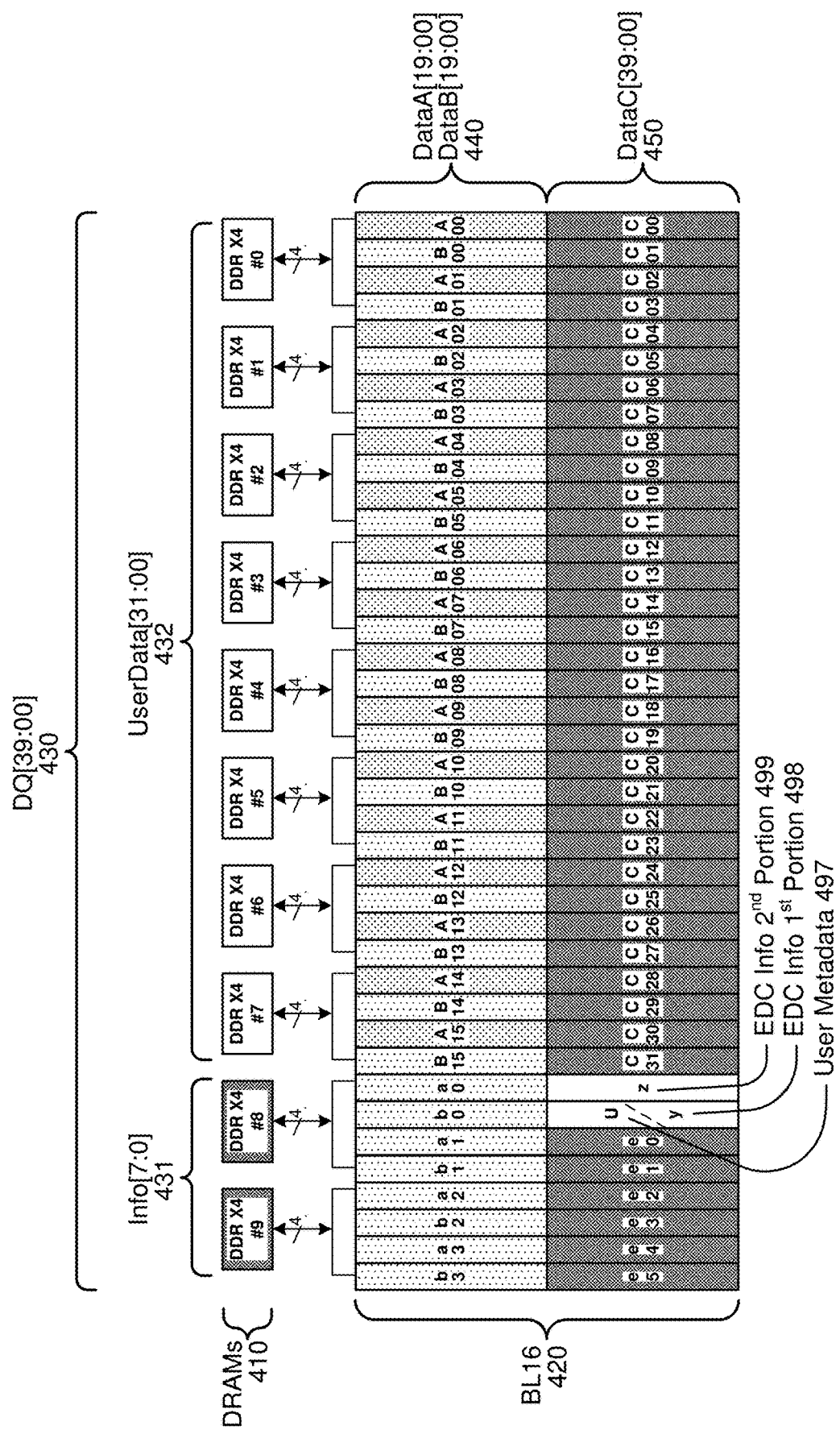
FIG. 4 illustrates an example of operation of dual-ECC codes for metadata in memory systems, based on a configuration of 10×4 Double Data Rate 5 (DDR5) DRAMs.

FIG. 4 illustrates an example of operation of dual-ECC codes for metadata in memory systems, based on a configuration of 10×4 DDR5 DRAMs. The upper portion of the figure illustrates structural elements as DRAMs 410. The lower portion of the figure illustrates information transferred in a burst transfer to/from DRAMs 410 as BL16 420. Each element of BL16 420 ("b3", "a3" . . . "b0", "a0" . . . "B15", "A15" . . . "B00", "A00" as well as "e5" . . . "e0", "U/y", "z", "C31" . . . "C00") corresponds to eight bits (8 b) also referred to as one byte (1 B).

DRAMs 410 include 10 four-bit wide (e.g., each having four DQ signal lines) DDR DRAM elements (identified as "DDR×4 #9" to "DDR×4 #0"). Eight of the DDR DRAM elements (DDR×4 #7-#0) are used to store user data. A total of 64 B of user data are communicated for each burst transfer on 32 signals lines as illustrated by UserData[31:00] 432 (32 b/cycle*16 cycles/burst=64 B/burst). A total of 16 B of other information (e.g., ECC information and user metadata information) are communicated for each burst transfer on eight signal lines as illustrated by Info [7:0] 431 (8 b/cycle*16 cycles/burst=16 B/burst). UserData[31:00] 432 and Info [7:0] 431 are identified collectively as DQ[39:00] 430.

A first portion (corresponding to the first half of a burst transfer) of BL16 420 is identified as DataA [19:00] DataB [19:00] 440 and a second portion (corresponding to the second half of a burst transfer) is identified as DataC[39:00] 450. DataA [19:00] DataB [19:00] 440 includes information to/from DDR×4 #9-#8 as "b3" to "b0" (b [3:0]) and "a3" to "a0" (a [3:0]), each representing 1 b of information over each edge (DDR) of four DQ signals for 8 b (1 B) total in the first portion of each burst transfer. E.g., b3 represents 1 B, a3 represents 1 B, and so forth. DataA [19:00] DataB [19:00] 440 further includes information to/from DDR×4 #7-#0 as "B15" to "B00" (B [15:00]) and "A15" to "A00" (A [15:00]), each representing 1 b of information over each edge (DDR) of four DQ signals for 8 b (1 B) total in the first portion of each burst transfer.

DataC[39:00] 450 includes information to/from DDR×4 #9-#8 as "e5" to "e0" (e [5:0]), "U/y", and "z", each representing 1 b of information over each edge (DDR) of four DQ signals for 8 b (1 B) total in the second portion of each burst transfer. DataC[39:00] 450 includes information to/from DDR×4 #7-#0 as "C31" to "C00" (C[31:00]), each representing 1 b of information over each edge (DDR) of four DQ signals for 8 b (8 B) total in the second portion of each burst transfer.

Agent related user data (such as communicated with Agent 101 of FIG. 1) is collectively allocated to A [15:0] (corresponding to CW-A and CW-A' of FIG. 1), B [15:0] (corresponding to CW-B and CW-B' of FIG. 1), and C[31:0] (corresponding to CW-C and CW-C' of FIG. 1).

Dual-ECC code information (such as produced by Dual-ECC Encoding 103 and used by Dual-ECC Decoding 104 of FIG. 1) is collectively allocated to a [3:0] (corresponding to portions of CW-A and CW-A' of FIG. 1), b [3:0] (corresponding to portions of CW-B and CW-B' of FIG. 1), and e [5:0] (corresponding to portions of CW-C and CW-C' of FIG. 1). More specifically, a [3:0] and b [3:0] are used for first ECC information and e [5:0] is used for second ECC information.

Agent related user metadata (such as communicated with Agent 101 of FIG. 1) is allocated to a user metadata portion of U/y (referred to as "U" and illustrated as User Metadata 497). Dual-ECC code information (such as produced by Dual-ECC Encoding 103 and used by Dual-ECC Decoding 104 of FIG. 1) is allocated to an ECC portion of U/y (referred to as "y" illustrated as EDC Info 1$^{st}$ Portion 498). Additional Dual-ECC code information (such as produced by Dual-ECC Encoding 103 and used by Dual-ECC Decoding 104 of FIG. 1) is allocated to "z" illustrated as EDC Info 2$^{nd}$ Portion 499).

Q497, q498, and q499 are collectively allocated 2 B. Allocation between user metadata and EDC information is variable.

For a first example, 4 b are allocated to user metadata, and 12 b bits are allocated to EDC information, as illustrated in FIG. 4. For a second example, 2 B are allocated to user metadata, and no bits are allocated to EDC information. For a third example, no bits are allocated to user metadata, and 2 B bytes are allocated to EDC information. For a fourth example, bits are evenly allocated to user metadata and EDC information.

FIG. 5 illustrates a flow diagram of writing to DRAM using dual-ECC encoding to enable error correction, as Write DRAMs 500.

Responsive to an agent (e.g., Agent 101 of FIG. 1) requesting a write to DRAM, the method begins (Write Data 501). The agent provides 64 B of data (corresponding, e.g., to Data (from Agent) 234 of FIG. 2) and one or more bits of user metadata (corresponding, e.g., to MD (from Agent) 233 of FIG. 2).

The method then proceeds to generate (e.g., encode) 8 B of first ECC information (at ECC1 Encode 502) in accordance with a first ECC code applied to the lower 32 B of the 64 B data. The lower 32 B of data and the 8 B of first ECC information corresponds, e.g., collectively to CW-A even DQs 235 and CW-B odd DQs 236 of FIG. 2. An example of the first ECC code is an RS(20, 16, 8) code. An example implementation of the generating of the first ECC information is ECC1 Encoding 231 of FIG. 2.

The method then proceeds to optionally generate (optional) EDC information (at EDC Encode 503) in accordance with an EDC technique (e.g., one or more checksums), applied to the upper 32 B of data and the one or more bits of user metadata. Assuming the one or more bits of user metadata are X bits, then, in view of an allocation of 2 B (16 b) to user metadata and optional EDC information together, 16-X bits of optional EDC information is produced by the EDC technique. An example implementation of the generating of the optional EDC information is EDC (encoder) 239 of FIG. 2. Responsive to EDC generation being omitted, EDC Encode 503 is skipped.

The method then proceeds to generate (e.g., encode) 6 B of second ECC information (at ECC2 Encode 504) in accordance with a second ECC code applied to the upper 32 B of the 64 B, the one or more bits of user metadata, and the optional EDC information. The upper 32 B of data, the 6 B of second ECC information and the 2 B total of user metadata and optional EDC information corresponds, e.g., to CW-C all DQs 237 of FIG. 2. An example of the second ECC code is an RS(40, 34, 8) code. An example implementation of the generating of the second ECC information is ECC2 Encoding 232 of FIG. 2.

The method then proceeds to process the 80 B total of encoding results produced in ECC1 Encode 502 and ECC2 Encode 504 (that also includes results, if any, produced in EDC Encode 503). The processing includes converting the 80 B total to information provided serially, 40 b at a time (per half-clock) with optional interleaving (at Interleave 505). Various aspects of an example implementation of the processing without interleaving are illustrated as Bytes to DQs—No Interleaving 305A of FIG. 3A. Various aspects of an example implementation of the processing with interleaving are illustrated as Bytes to DQs-Interleaving 305B of FIG. 3B.

The method concludes with one or DRAMs performing a burst write of the serialized and optionally interleaved 80 B total encoding results (at DRAM Burst Write 506).

The method of Write DRAMs 500 is directed, for example, by a control element, such as a dual-ECC encoder controller logic block.

FIG. 6 illustrates a flow diagram of reading from DRAM using dual-ECC decoding to perform error correction, as Read DRAMs 600.

Responsive to an agent (e.g., Agent 101 of FIG. 1) requesting a read from DRAM, the method begins with one or more DRAMs performing a burst read (at DRAM Burst Read 601).

The method then proceeds to process the 40 b at a time of serially provided information to deserialize it to 80 B total with optional deinterleaving (at [Deinterleave] 602). Various aspects of an example implementation of the processing without deinterleaving are illustrated as DQs to Bytes—No Deinterleaving 306A of FIG. 3A. Various aspects of an example implementation of the processing with deinterleaving are illustrated as DQs to Bytes—Deinterleaving 306B of FIG. 3B.

The method then proceeds to produce, via first error correction (e.g., decode), the lower 32 B of 64 B of user data (to return to the agent) in accordance with a first ECC code applied to the lower 40 B of the 80 B total (at ECC1 Decode and Analysis 603). The lower 40 B corresponds, e.g., to CW-A' even DQs 245 and CW-B' odd DQs 246 of FIG. 2. An example of the first ECC code is an RS(20, 16, 8) code. An example implementation of the decoding of the first ECC information is ECC1 Decoding 241 of FIG. 2.

The first error correction of ECC1 Decode and Analysis 603 determines whether all detected errors are Correctable Errors (CEs) as well as whether there is an apparent device failure (e.g., detection of a chip failure) and if so, which device failed (e.g., via analysis of the error correction). Error detection and device failure information determined via ECC1 Decode and Analysis 603 (e.g., as represented by ECC1 Dec Info 240 of FIG. 2) is provided to second error correction that is in accordance with a second ECC code.

Responsive to not all detected errors being correctable, (ECC1 All CE? 604 as determined by ECC1 Decode and Analysis 603), the method proceeds (No 604N) to indicate one or more errors that are not correctable (Uncorrectable Error 611), such as to the agent, and flow is complete. Alternatively, responsive to all detected errors being correctable, flow proceeds (Yes 604Y) to the second error correction.

The second error correction produces (e.g., decodes) the upper 32 B of the 64 B of user data (to return to the agent) and Xb of user metadata (also to return to the agent), as well an optional 16-Xb of EDC information. The optional EDC information is usable to check (e.g., for aliasing) the 32 B and Xb results of the second error correction. The results and the optional 16-Xb of EDC information are generated in accordance with the second ECC code applied to the upper 40 B of the 80 B total (either ECC2 Erasure Decode and Analysis 606 or ECC2 Error Decode and Analysis 607). The upper 40 B corresponds, e.g., to CW-C' all DQs 247 of FIG. 2. An example implementation of the second ECC code is an RS(40, 34, 8) code. An example implementation of the decoding of the second ECC information is ECC2 Decoding 242 of FIG. 2. The second ECC code is used selectively in one of two modes based on whether there is an apparent device failure (Device Failure? 605 as determined by ECC1 Decode and Analysis 603).

Responsive to detection of an apparent device failure, the method proceeds (Yes 605Y) to the second error correction according to the second ECC code used in an erasure decoding mode (at ECC2 Erasure Decode and Analysis 606). The erasure decoding mode of ECC2 Erasure Decode and Analysis 606 uses the determination of which device failed as erasure locations.

Alternatively, responsive to lack of detection of an apparent device failure, flow proceeds (No 605N) to the second error correction according to the second ECC code used in an error decoding mode (ECC2 Error Decode and Analysis 607). The error decoding mode ignores the determination of which device failed.

Since results of the first error correction (e.g., via use of the first ECC code) are used by the second error correction (e.g., via selection of erasure or error decoding modes for the second ECC code), use of the first and the second ECC codes are cascaded, the second being dependent on the first.

Each of the error corrections of ECC2 Erasure Decode and Analysis 606 and ECC2 Error Decode and Analysis 607 determine whether all detected errors are correctable. Responsive to not all detected errors being correctable, (ECC2 All CE? 608 as determined by either ECC2 Erasure Decode and Analysis 606 or ECC2 Error Decode and Analysis 607), the method proceeds (No 608N) to indicate one or more errors that are not correctable (Uncorrectable Error 611), such as to the agent, and flow is complete.

Alternatively, responsive to all detected errors being correctable, flow optionally proceeds (Yes 608Y) to (optional) EDC processing (EDC OK? 609). The EDC processing checks the results of the second error correcting for erroneous results (e.g., due to aliasing) using the EDC information according to an EDC decoding technique (such as compatible with the EDC encoding technique of EDC Encode 503 of FIG. 5; e.g., one or more checksums). Responsive to an unsuccessful check, flow proceeds (No 609N) to indicate one or more errors that are not correctable (Uncorrectable Error 611), such as to the agent, and flow is complete. An example of the EDC processing is EDC (decoder) 249 of FIG. 2.

Responsive to a successful check, flow proceeds (Yes 609Y) to provide the lower 32 B of user data and the upper 32 B of user data, corresponding, e.g., to Data (to Agent) 244 of FIG. 2, as well as the Xb of user metadata to the agent, corresponding, e.g., to MD (to Agent) 243 of FIG. 2 (Return Data 610) and flow is complete.

A description of an example dual-ECC decoding technique, such as in accordance with examples of Dual-ECC Encoding 103 and/or Dual-ECC Decoding 104 of FIG. 1, is illustrated as pseudo code in FIG. 7, as Pseudo Code Example 700.

Figure 8A:
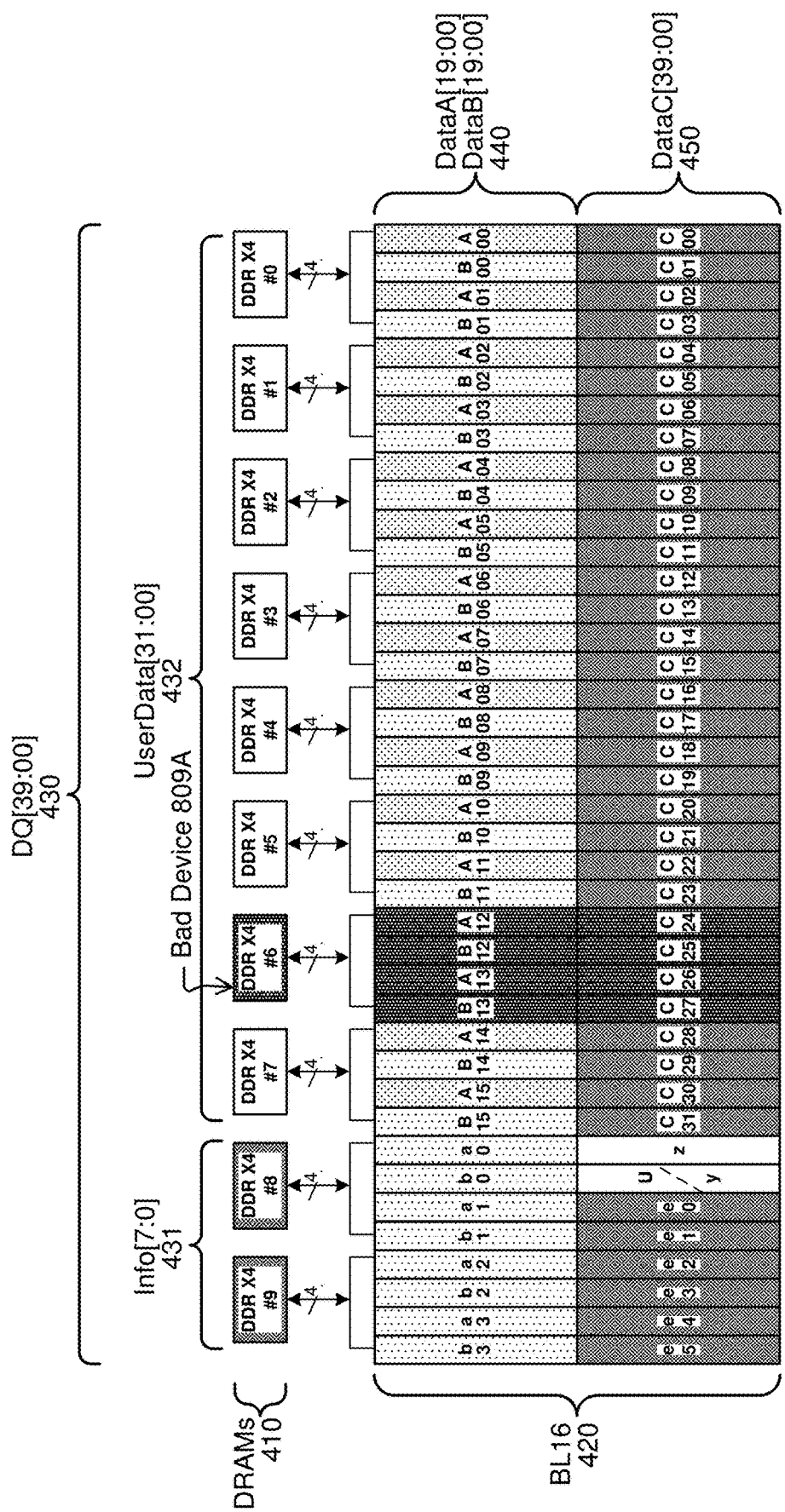
FIGS. 8A-8C (collectively referred to as FIG. 8) illustrate examples of error correction using dual-ECC codes.
Figure 8B:
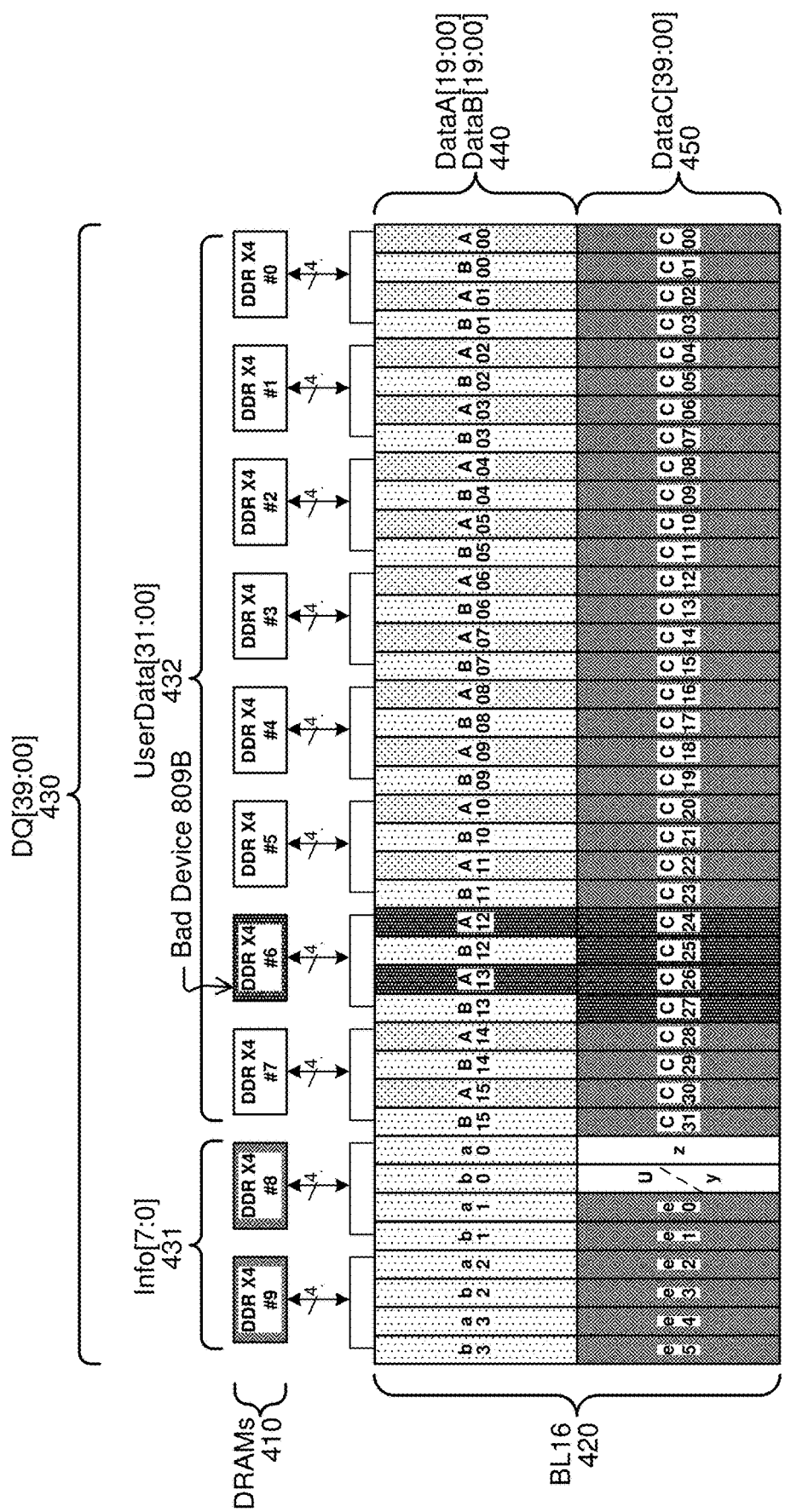
Figure 8C:
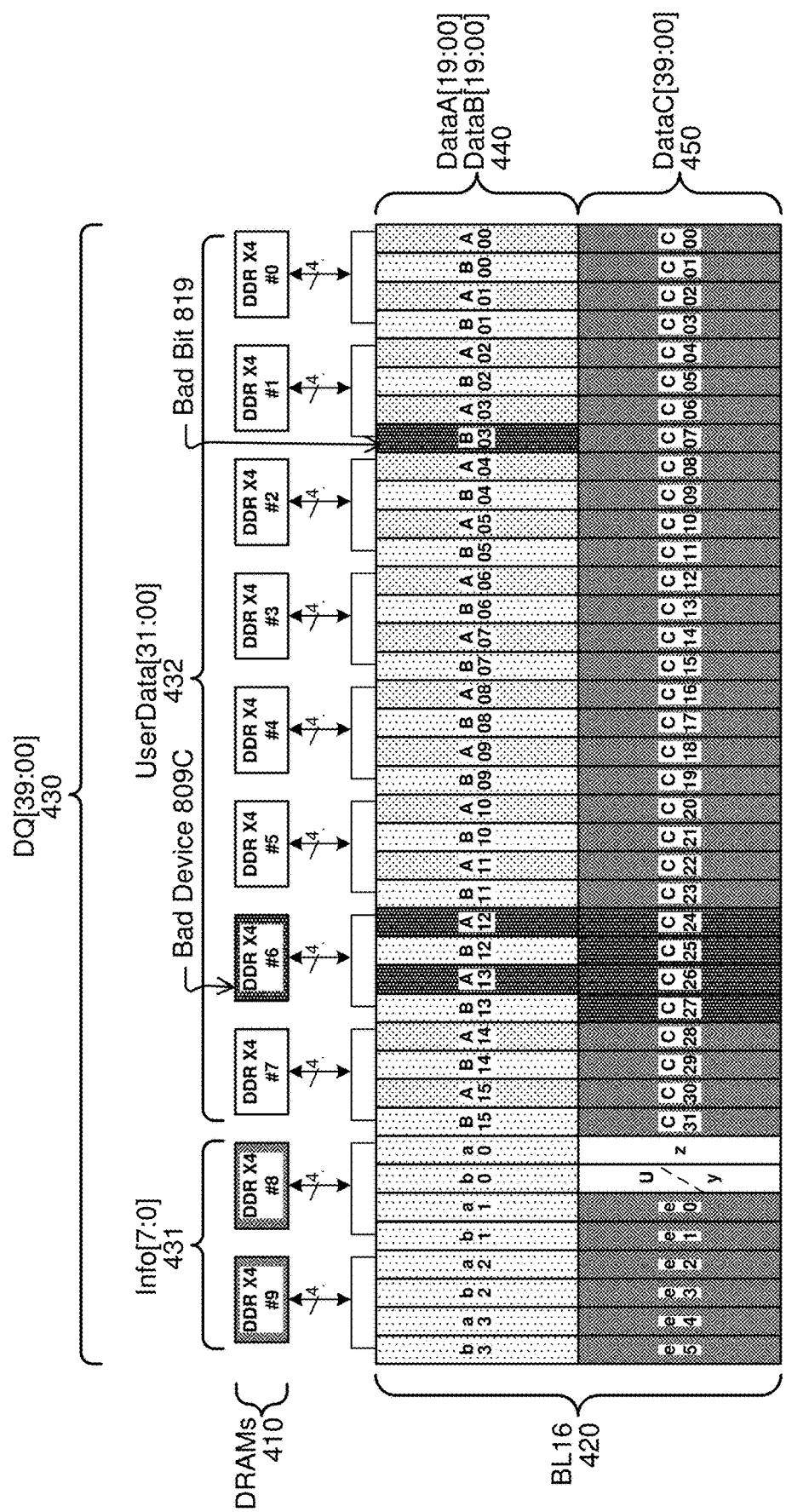

FIGS. 8A-8C illustrate examples of error correction using dual-ECC codes using the operating context illustrated by FIG. 4. Elements of FIGS. 8A-8C having element identifiers matching those of FIG. 4 are representative of corresponding elements of FIG. 4 and are not further described here.

In the example of FIG. 8A, a device failure indicated by Bad Device 809A (e.g., corresponding to a device failure detection) introduces single errors in each of A13 and A12 (corresponding to CW-A) and in each of B13 and B12 (corresponding to CW-B) of DataA [19:00] DataB [19:00] 440 as well as single errors in each of C27, C26, C25, and C24 (corresponding to CW-C) of DataC[39:00] 450. Decoding of the first ECC information detects (and corrects) the four single errors of DataA [19:00] DataB [19:00] 440. The decoding of the first ECC information determines that four out of the four single errors are in a same ×4 device, Bad Device 809A, and therefore it is identified as a device failure. Responsive to the decoding of the first ECC information detecting the device failure, decoding of the second ECC information is according to the erasure decoding mode. Erasure locations are set to identify the failed device (Bad Device 809A). Since the second ECC code enables detection and correction of four erasures (as well as one more error), the decoding of the second ECC information enables correcting the four single errors of DataC[39:00] 450.

In the example of FIG. 8B, a device failure indicated by Bad Device 809B (e.g., corresponding to a device failure detection) introduces single errors in each of A13 and A12 (corresponding to CW-A) of DataA [19:00] DataB [19:00] 440 as well as single errors in each of C27, C26, C25, and C24 (corresponding to CW-C) of DataC[39:00] 450. Decoding of the first ECC information detects (and corrects) the two single errors of DataA [19:00] DataB [19:00] 440. The decoding of the first ECC information determines that two out of the two single errors are in a same ×4 device, Bad Device 809B, and therefore it is identified as a device failure. Responsive to the decoding of the first ECC information detecting the device failure (Bad Device 809B), decoding of the second ECC information is according to the erasure decoding mode. Erasure locations are set to identify the failed device (Bad Device 809B). Since the second ECC code enables detection and correction of four erasures (as well as one more error), the decoding of the second ECC information enables correcting the four single errors of DataC[39:00] 450.

In the example of FIG. 8C, similar to FIG. 8B, a device failure indicated by Bad Device 809C (e.g., corresponding to a device failure detection) introduces single errors in each of A13 and A12 (corresponding to CW-A) of DataA [19:00] DataB [19:00] 440 as well as single errors in each of C27, C26, C25, and C24 (corresponding to CW-C) of DataC[39:00] 450. There is also an additional single error Bad Bit 819 in B03 (corresponding to CW-B) of DataA [19:00] DataB [19:00] 440. Decoding of the first ECC information detects (and corrects) the three single errors of DataA [19:00] DataB [19:00] 440. The decoding of the first ECC information determines that two out of the three single errors are in a same ×4 device, Bad Device 809C, and therefore it is identified as a device failure. Responsive to the decoding of the first ECC information detecting the device failure (Bad Device 809C), decoding of the second ECC information is according to the erasure decoding mode. Erasure locations are set to identify the failed device (Bad Device 809C). Since the second ECC code enables detection and correction of four erasures (as well as one more error), the decoding of the second ECC information enables correcting the four single errors of DataC[39:00] 450.

In some situations, the examples of error correction using dual-ECC codes illustrated in FIG. 8 are in a context having 2 B allocated to user metadata and no allocation for EDC information (e.g., EDC encoding/decoding is omitted).

Figure 9A:
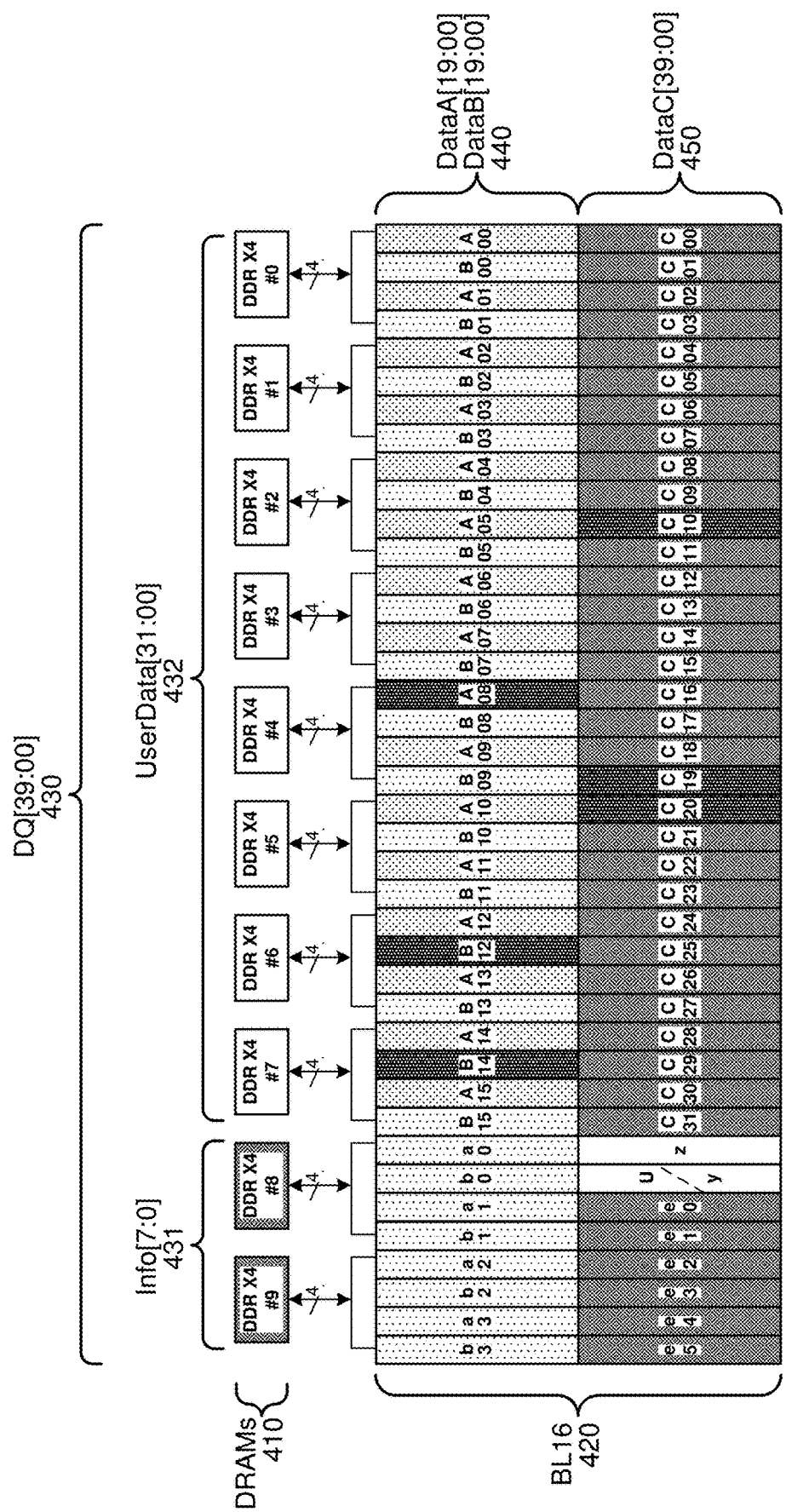
FIGS. 9A-9C (collectively referred to as FIG. 9) illustrate additional examples of error correction using dual-ECC codes.
Figure 9B:
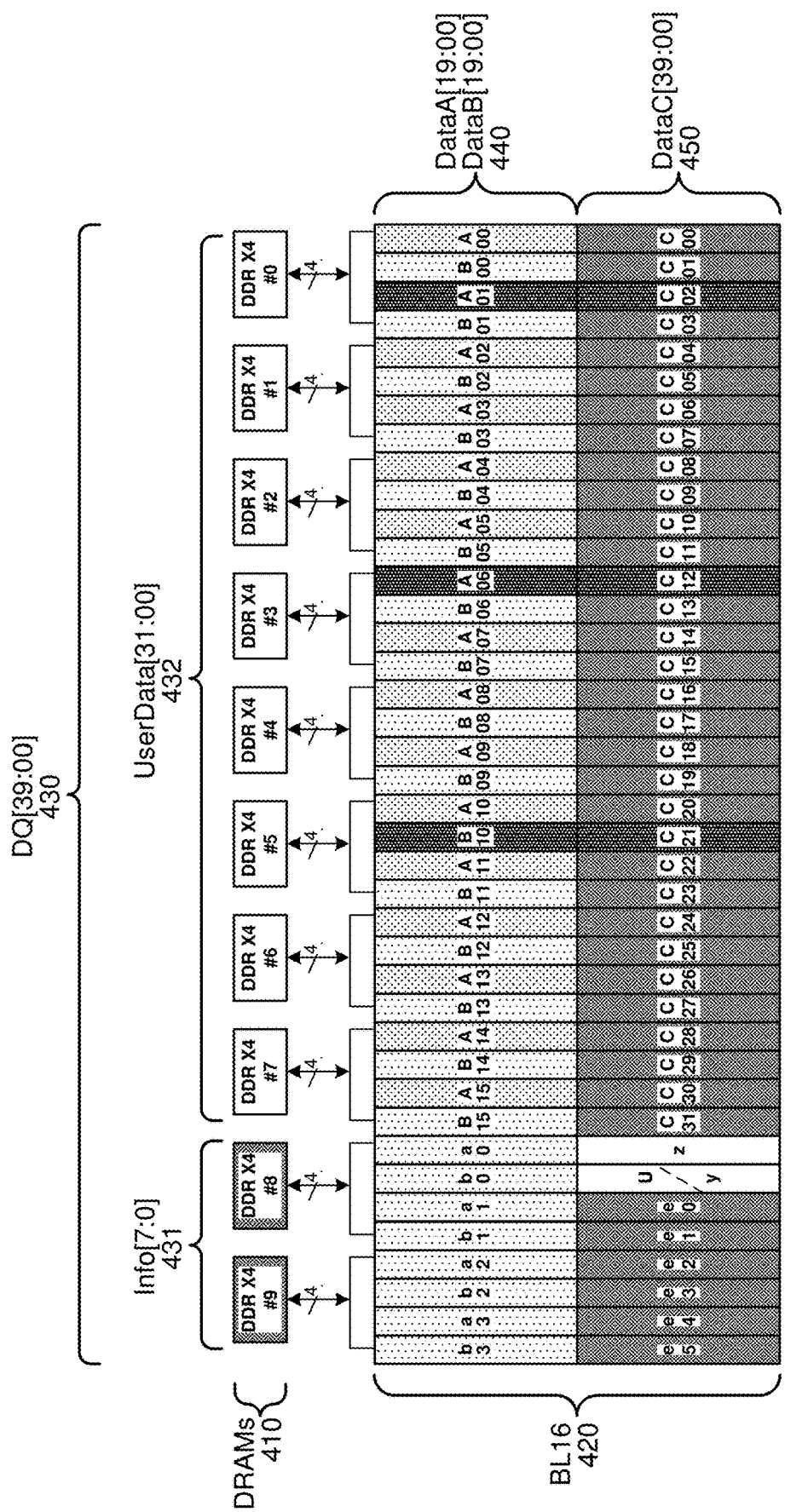
Figure 9C:
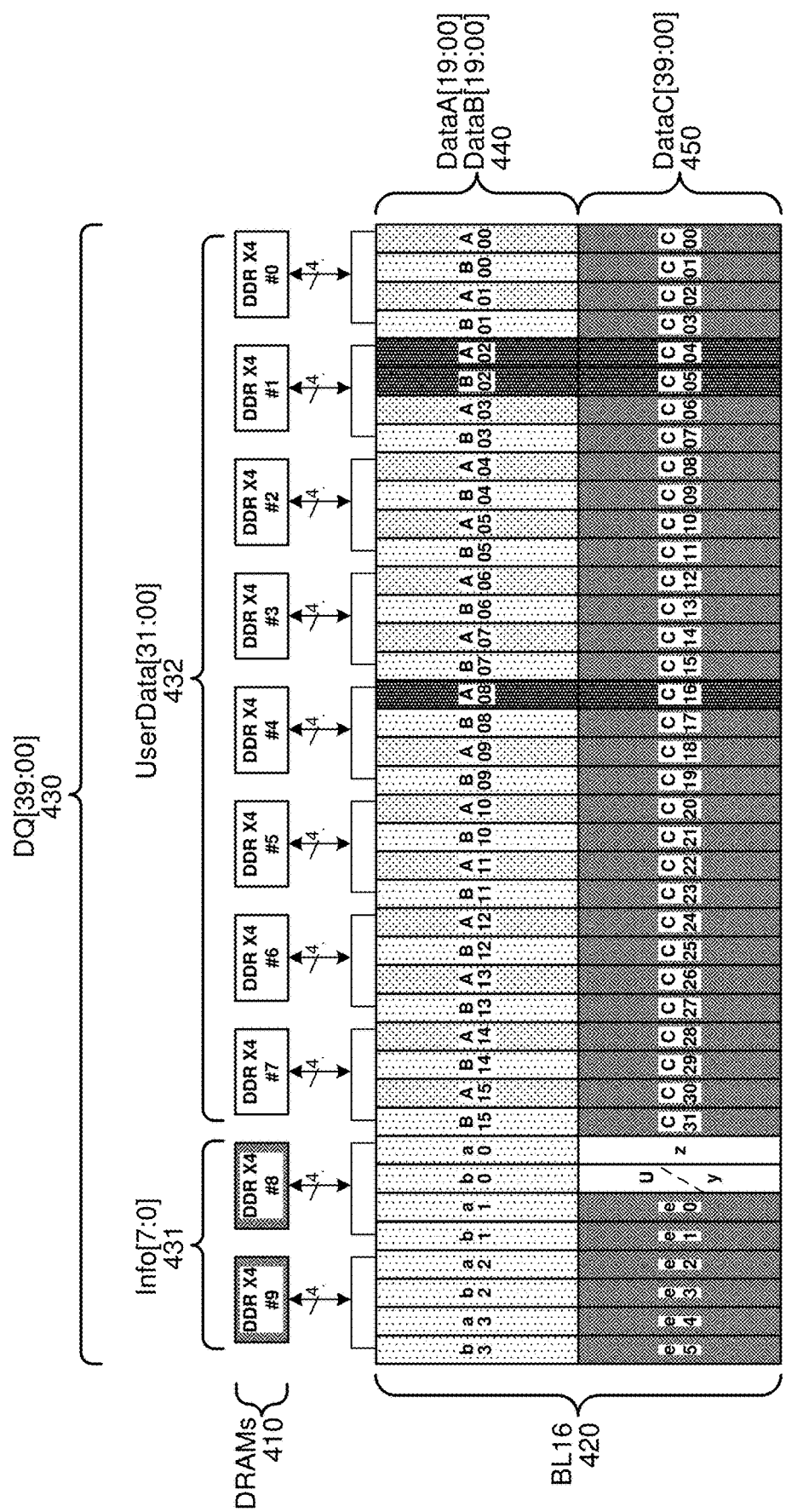

FIGS. 9A-9C illustrate additional examples of error correction using dual-ECC codes using the operating context illustrated by FIG. 4. Elements of FIGS. 9A-9C having element identifiers matching those of FIG. 4 are representative of corresponding elements of FIG. 4 and are not further described here.

In the example of FIG. 9A, there are random errors in B14 of DDR×4 #7, B12 of DDR×4 #6, and A08 of DDR×4 #4 as well as random errors in C20 of DDR×4 #5, C19 of DDR×4 #4, and C10 of DDR×4 #2. Decoding of the first ECC information detects (and corrects) the single errors in each of DDR×4 #7, #6, and #4. Responsive to the decoding of the first ECC information detecting three single errors, decoding of the second ECC information is according to the error decoding mode. Since the second ECC code enables detection and correction of up to three single errors, the decoding of the second ECC information enables correcting the single errors in each of DDR×4 #5, #4, and #2.

In the example of FIG. 9B, there are three single DQ bounded faults, each resulting in a single error in each of B10/C21 of DDR×4 #5, A06/C12 of DDR×4 #3, and A01/C02 of DDR×4 #0. As in FIG. 9A, decoding of the first ECC information detects (and corrects) the three single errors of DataA [19:00] DataB [19:00] 440. Responsive to the decoding of the first ECC information detecting three single errors, decoding of the second ECC information is according to the error decoding mode. Since the second ECC code enables detection and correction of up to three single errors, the decoding of the second ECC information enables correcting the three single errors of DataC[39:00] 450.

In the example of FIG. 9C, there is one single DQ bounded fault, resulting in a single error in each of A08/C16 of DDR×4 #4 as well as one dual DQ bounded fault, resulting in a single error in each of B02/C05 and A02/C04 of DDR×4 #1. As in FIG. 9A and FIG. 9B, decoding of the first ECC information detects (and corrects) the three single errors of DataA [19:00] DataB [19:00] 440. Responsive to the decoding of the first ECC information detecting three single errors, decoding of the second ECC information is according to the error decoding mode. Since the second ECC code enables detection and correction of up to three single errors, the decoding of the second ECC information enables correcting the three single errors of DataC[39:00] 450.

In some situations, the examples of error correction using dual-ECC codes illustrated in FIG. 9 are in a context having 2 B allocated to user metadata and no allocation for EDC information (e.g., EDC encoding/decoding is omitted).

The above specific example technique for dual-ECC codes uses ECC1 of RS(20, 16, 8) and ECC2 of RS(40, 34, 8). Another specific example technique for dual-ECC codes uses ECC1 of RS(40, 32, 8) and ECC2 of RS(40, 36, 8).

Figure 10:
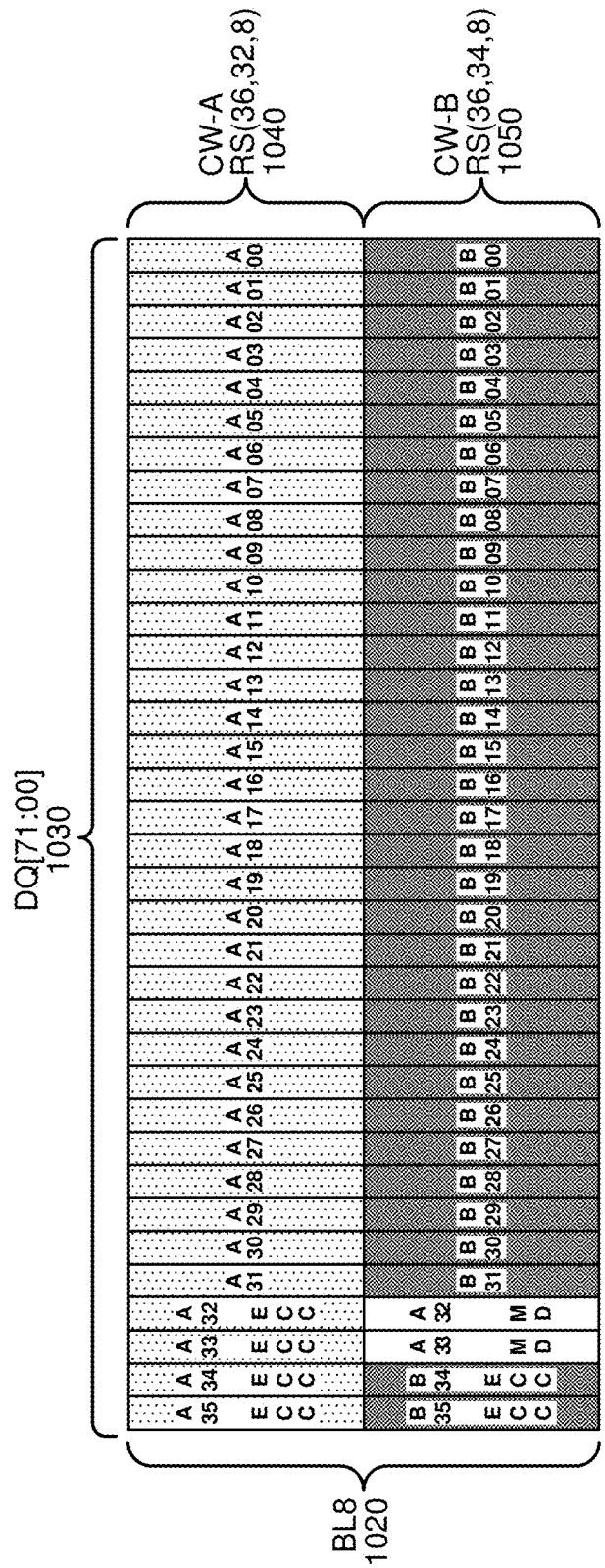
FIG. 10 illustrates another example of operation of dual-ECC codes for metadata in memory systems.

FIG. 10 illustrates another example of operation of dual-ECC codes for metadata in memory systems, based on 18×4 DDR4 DRAMs. In the illustrated example, the first ECC code is an RS(36, 32, 8) code that generates 4 B of ECC information (e.g., parities) based on 32 B of data. The second ECC code is an RS(36, 34, 8) code that generates 2 B of ECC information (e.g., parities) based on 32 B of data and 2 B of user metadata.

CW-A RS(36, 32, 8) 1040 represents operation of the first ECC code and CW-B RS(36, 34, 8) 1050 represents operation of the second ECC code. DQ[71:00] 1030 represents 72 DQ signals associated with the 18×4 DDR4 DRAMs. BL8 1020 represents the burst length of eight associated with the 18×4 DDR4 DRAMs.

The first ECC code enables correcting two errors and exhibits aliasing of 0.95% if there are three or more errors in a CW. The second ECC code enables correcting one error in error decoding mode and correcting two erasures in erasure decoding mode. The second ECC code exhibits aliasing of 14% if there are two or more errors in one CW in error decoding mode. Aliasing is reducible by reducing bits allocated to user metadata and instead allocating those bits to EDC information. For example, allocating 8 b to user metadata in combination with 8 b of EDC information reduces aliasing to 0.055%. For another example, allocating 4 b to user metadata in combination with 12 b of EDC information reduces aliasing of the second ECC mode to 0.0034%. Aliasing with respect to the second ECC code impacts ECC capability such as when the first ECC code has two correctable errors that are in different DRAMs (e.g., two different ×4 devices). Thus, a system operating in accordance with FIG. 10 is enabled to provide device failure detection and user metadata, such as 4 b or 8 b of user metadata.

Another example of operation of dual-ECC codes for metadata in memory systems is based on 9×4 DDR5 DRAMs. Using the above first and second ECC codes enables providing device failure detection for whole-device and/or half-device failure situations using DDR5-supported bounded faults and user metadata, such as 4 b or 8 b of user metadata.

Figure 11:
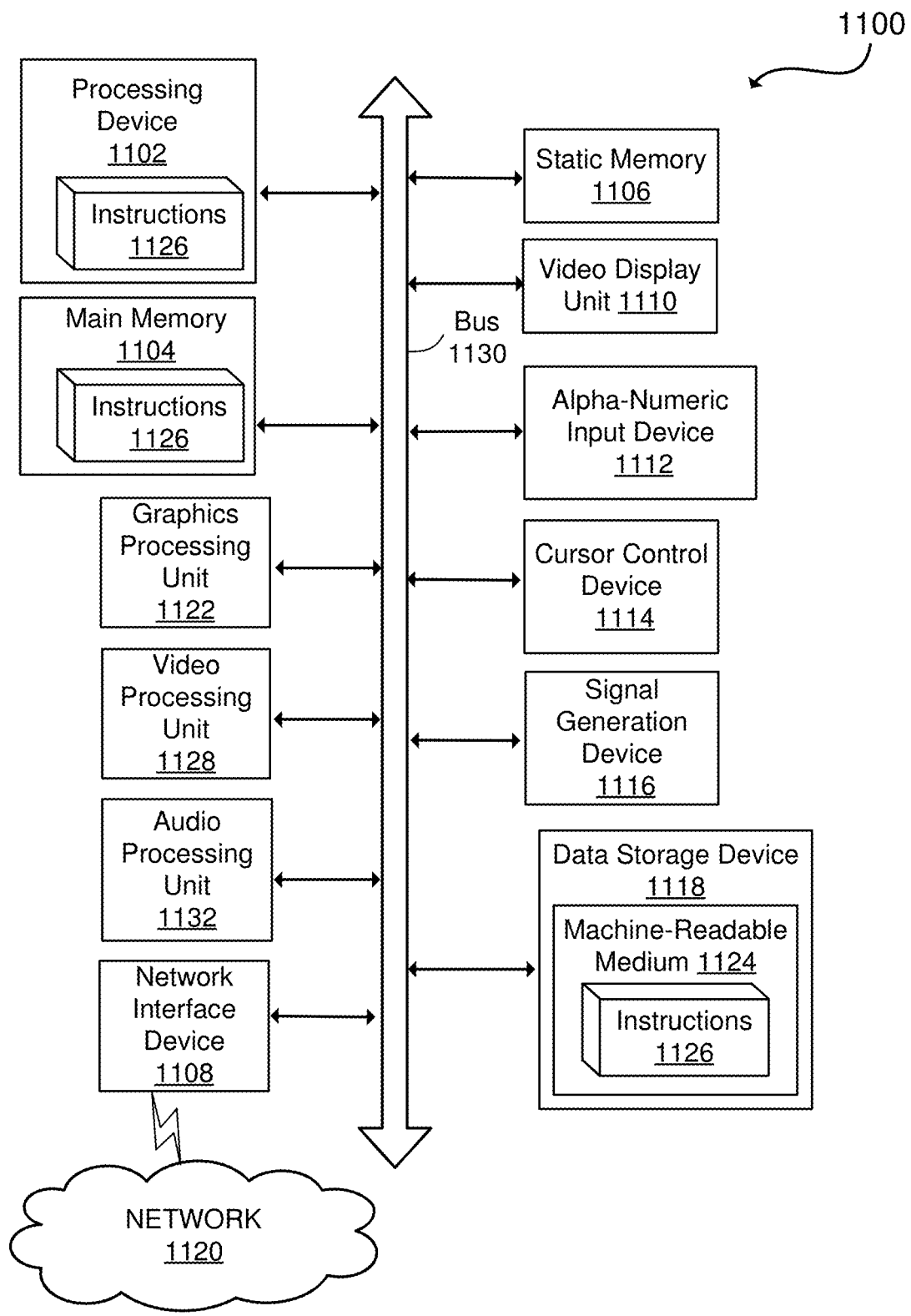
FIG. 11 illustrates a diagram of an example computer system in which embodiments of the present disclosure may operate.

FIG. 11 illustrates an example machine as Computer System 1100 within which a set of instructions, for causing the machine to perform any one or more of the methodologies discussed herein, may be executed. In alternative implementations, the machine may be connected (e.g., networked) to other machines in a Local Area Network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a Personal Computer (PC), a tablet PC, a Set-Top Box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer System 1100 includes Processing Device 1102, Main Memory 1104 (e.g., Read-Only Memory (ROM), flash memory, DRAM such as synchronous DRAM (SDRAM), Static Memory 1106 (e.g., flash memory, Static Random Access read/write Memory (SRAM), etc.), and Data Storage Device 1118, which communicate with each other via Bus 1130.

Processing Device 1102 represents one or more processors such as a microprocessor, a central processing unit, or the like. More particularly, the processing device may be Complex Instruction Set Computing (CISC) microprocessor, Reduced Instruction Set Computing (RISC) microprocessor, VLIW microprocessor, or a processor implementing other instruction sets, or processors implementing a combination of instruction sets. Processing Device 1102 may also be one or more special-purpose processing devices such as an ASIC, an FPGA, a digital signal processor (DSP), network processor, or the like. Processing Device 1102 may be configured to execute Instructions 1126 for performing the operations and steps described herein.

Computer System 1100 may further include Network Interface Device 1108 to communicate over NETWORK 1120. Computer System 1100 also may include Video Display Unit 1110 (e.g., a Liquid Crystal Display (LCD) or a Cathode Ray Tube (CRT)), Alpha-Numeric Input Device 1112 (e.g., a keyboard), Cursor Control Device 1114 (e.g., a mouse), Graphics Processing Unit 1122, Signal Generation Device 1116 (e.g., a speaker), Graphics Processing Unit 1122, Video Processing Unit 1128, and Audio Processing Unit 1132.

Data Storage Device 1118 may include Machine-Readable Medium 1124 (also known as a non-transitory computer-readable medium) on which is stored one or more sets of Instructions 1126 or software embodying any one or more of the methodologies or functions described herein. Instructions 1126 may also reside, completely or at least partially, within Main Memory 1104 and/or within Processing Device 1102 during execution thereof by Computer System 1100, Main Memory 1104 and Processing Device 1102 also constituting machine-readable storage media.

In some implementations, Instructions 1126 include instructions to implement functionality corresponding to the present disclosure. While Machine-Readable Medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and Processing Device 1102 to perform any one or more of the methodologies of the present disclosure. The term "machine-readable storage medium" shall accordingly be taken to include, but not be limited to, solid-state memories, optical media, and magnetic media.

In an example of Computer System 1100, Main Memory 1104 implements techniques for dual-ECC codes for metadata in memory systems via inclusion of elements similar to any one or more of Dual-ECC Encoding 103, Dual-ECC Decoding 104, Bytes to DQs 105, and DQs to Bytes 106 of FIG. 1 for operation with, e.g., main memory elements similar to DRAM 102 of FIG. 1. Continuing with the example, any one or more elements operable to communicate with Main Memory 1104, e.g., via Bus 1130, such as Processing Device 1102, Graphics Processing Unit 1122, Video Processing Unit 1128, Audio Processing Unit 1132, Network Interface Device 1108, Video Display Unit 1110, Signal Generation Device 1116, and/or Data Storage Device 1118 are operable as agents, similar to Agent 101 of FIG. 1.

A system of one or more computers is configurable to perform particular operations or actions by virtue of having software, firmware, hardware, or a combination of them installed on the system that in operation causes or cause the system to perform the actions. One or more computer programs is configurable to perform particular operations or actions by virtue of including instructions that, when executed by a data processing apparatus, cause the apparatus to perform the actions.

A first aspect includes a method that includes error correcting first uncorrected data according to a first error correcting code, producing first corrected data and an indicator of whether a device failure is detected; and responsive to the indicator indicating that a device failure is detected, error correcting second uncorrected data according to (1) a second error correcting code and (2) an erasure decoding mode, and using an identification of a failing device produced by the error correcting of the first uncorrected data. Variations of this aspect include corresponding computer systems, apparatuses, and/or computer programs recorded on one or more computer storage devices, each configured to perform the actions of the methods.

Aspects optionally include one or more of the following features. The method optionally includes, responsive to the indicator indicating that a device failure is not detected, error correcting the second uncorrected data according to an error decoding mode. Results of the error correcting of the second uncorrected data optionally include user metadata. Each of the first error correcting code and the second error correcting code is a respective Reed-Solomon code. The first error correcting code is in accordance with a Reed-Solomon (20, 16, 8) code and the second error correcting code is in accordance with a Reed-Solomon (40, 34, 8) code. The first error correcting code enables detection of more errors than the second error correcting code. Variations of the described aspects optionally include hardware, a system, a method or process, and/or computer software on a computer-accessible medium.

A second aspect includes a method that includes error correcting uncorrected data according to an error correcting code, producing one or more error correcting mode indicators; and selecting one of a plurality of error correcting decoding modes in dependence on the error correcting mode indicators. Variations of this aspect include corresponding computer systems, apparatuses, and/or computer programs recorded on one or more computer storage devices, each configured to perform the actions of the methods.

Aspects optionally include one or more of the following features. The method where the plurality of error correcting decoding modes optionally includes an error decoding mode and an erasure decoding mode, and the error correcting mode indicators indicate the error decoding mode responsive to lack of detection of a device failure and indicate the erasure decoding mode responsive to detection of a device failure. The uncorrected data is first uncorrected data and optionally includes error correcting second uncorrected data according to the selected error correcting decoding mode. Results of the error correcting of the second uncorrected data optionally include user metadata. The error correcting of the first uncorrected data further produces first error corrected data and the error correcting of the second uncorrected data produces second error corrected data. The error correcting of the first uncorrected data is according to a first error correcting code and the error correcting of the second uncorrected data is according to a second error correcting code. The method optionally includes receiving a request from an agent, where the error correcting of the first uncorrected data is at least partially responsive to the request; and providing at least some results of the error correcting of the first uncorrected data and at least some results of the error correcting of the second uncorrected data to the agent. The method optionally includes producing error correction information in accordance with the first error correcting code and the second error correcting code. The first uncorrected data and the second uncorrected data are provided by a same device. Variations of the described aspects optionally include hardware, a system, a method or process, and/or computer software on a computer-accessible medium.

A third aspect includes a system that includes first error correcting hardware circuitry enabled to receive first user data and to produce first error correcting information therefrom according to a first error correcting code; and second error correcting hardware circuitry enabled to receive user metadata and second user data, and to produce second error correcting information therefrom according to a second error correcting code.

Aspects optionally include one or more of the following features. The system where the first error correcting code enables detection of more errors than the second error correcting code. The system where the producing of the first error correcting information and the producing of the second error correcting information are in accordance with storing each respective byte of the first user data in a same storage device as a corresponding respective byte of the second user data. The system where the second error correcting hardware circuitry is further enabled to receive error detection code information and to produce the second error correcting information in dependence therefrom, and optionally includes third error correcting hardware circuitry enabled to receive the second user data and to produce the error detection code information therefrom according to an error detection coding usable to detect aliasing. The first error correcting code is in accordance with a Reed-Solomon (20, 16, 8) code and the second error correcting code is in accordance with a Reed-Solomon (40, 34, 8) code. Variations of the described aspects optionally include hardware, a system, a method or process, and/or computer software on a computer-accessible medium.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, Compact Disc Read Only Memories (CD-ROMs), and magnetic-optical disks, Read-Only Memories (ROMs), random access memories (RAMs), Electrically Programmable Read Only Memories (EPROMs), Electrically Erasable Programmable Read Only Memories (EEPROMs), magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   error correcting first uncorrected data according to a first error correcting code, producing first corrected data and an indicator of whether a device failure is detected; and
   responsive to the indicator indicating that a device failure is detected, error correcting second uncorrected data according to (1) a second error correcting code and (2) an erasure decoding mode, and using an identification of a failing device produced by the error correcting of the first uncorrected data, the error correcting of the second uncorrected data producing second corrected data, and
   wherein the first corrected data and the second corrected data are provided responsive to a single memory request.

2. The method of claim 1, further comprising, responsive to the indicator indicating that a device failure is not detected, error correcting the second uncorrected data according to an error decoding mode.

3. The method of claim 1, wherein results of the error correcting of the second uncorrected data comprise user metadata.

4. The method of claim 1, wherein each of the first error correcting code and the second error correcting code is a respective Reed-Solomon code.

5. The method of claim 4, wherein the first error correcting code is in accordance with a Reed-Solomon (20, 16, 8) code and the second error correcting code is in accordance with a Reed-Solomon (40, 34, 8) code.

6. The method of claim 1, wherein the first error correcting code enables detection of more errors than the second error correcting code.

7. A method comprising:
   error correcting uncorrected data according to an error correcting code, producing one or more error correcting mode indicators; and
   selecting one of a plurality of error correcting decoding modes in dependence on the error correcting mode indicators, and
   wherein the plurality of error correcting decoding modes comprises an error decoding mode and an erasure decoding mode, and the error correcting mode indicators indicate the error decoding mode responsive to lack of detection of a device failure and indicate the erasure decoding mode responsive to detection of a device failure.

8. The method of claim 7, wherein the device is one of a plurality of memory devices, and responsive to a single memory request, the uncorrected data is provided by the device and at least one other memory device of the plurality of memory devices.

9. The method of claim 7, wherein the uncorrected data is first uncorrected data and further comprising error correcting second uncorrected data according to the selected error correcting decoding mode.

10. The method of claim 9, wherein results of the error correcting of the second uncorrected data comprises user metadata.

11. The method of claim 9, wherein the error correcting of the first uncorrected data further produces first error corrected data and the error correcting of the second uncorrected data produces second error corrected data.

12. The method of claim 9, wherein the error correcting of the first uncorrected data is according to a first error correcting code and the error correcting of the second uncorrected data is according to a second error correcting code.

13. The method of claim 12, further comprising receiving a request from an agent, wherein the error correcting of the first uncorrected data is at least partially responsive to the request; and providing at least some results of the error correcting of the first uncorrected data and at least some results of the error correcting of the second uncorrected data to the agent.

14. The method of claim 12, further comprising producing error correction information in accordance with the first error correcting code and the second error correcting code.

15. The method of claim 9, wherein the first uncorrected data and the second uncorrected data are provided by a same device.

16. A system comprising:
   first error correcting hardware circuitry enabled to receive first user data and to produce first error correcting information and first error corrected user data therefrom according to a first error correcting code; and
   second error correcting hardware circuitry enabled to receive user metadata and second user data, and to produce second error correcting information and second error corrected user data therefrom according to a second error correcting code, wherein the first error corrected user data and the second error corrected user data are produced responsive to a single memory request.

17. The system of claim 16, wherein the first error correcting code enables detection of more errors than the second error correcting code.

18. The system of claim 16, wherein the producing of the first error correcting information and the producing of the second error correcting information are in accordance with storing each respective byte of the first user data in a same storage device as a corresponding respective byte of the second user data.

19. The system of claim 16, wherein the second error correcting hardware circuitry is further enabled to receive error detection code information and to produce the second error correcting information in dependence therefrom, and further comprising third error correcting hardware circuitry enabled to receive the second user data and to produce the error detection code information therefrom according to an error detection coding usable to detect aliasing.

20. The system of claim 16, wherein the first error correcting code is in accordance with a Reed-Solomon (20, 16, 8) code and the second error correcting code is in accordance with a Reed-Solomon (40, 34, 8) code.

* * * * *